US011059028B2

(12) United States Patent
Olson et al.

(10) Patent No.: US 11,059,028 B2
(45) Date of Patent: *Jul. 13, 2021

(54) ACTIVATED CARBON SORBENT INCLUDING NITROGEN AND METHODS OF USING THE SAME

(71) Applicant: Midwest Energy Emissions Corp., Lewis Center, OH (US)

(72) Inventors: Edwin S. Olson, Grand Forks, ND (US); John H. Pavlish, East Grand Forks, MN (US)

(73) Assignee: Midwwest Energy Emissions Corp., Corsicana, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/574,935

(22) Filed: Sep. 18, 2019

(65) Prior Publication Data

US 2020/0009532 A1 Jan. 9, 2020

Related U.S. Application Data

(63) Continuation of application No. 15/589,359, filed on May 8, 2017, now Pat. No. 10,471,412, which is a continuation of application No. 14/195,360, filed on Mar. 3, 2014, now Pat. No. 9,669,355.

(60) Provisional application No. 61/773,549, filed on Mar. 6, 2013.

(51) Int. Cl.

| | |
|---|---|
| *B01J 20/32* | (2006.01) |
| *B01D 53/64* | (2006.01) |
| *B01J 20/20* | (2006.01) |
| *B01D 53/02* | (2006.01) |
| *B01J 20/28* | (2006.01) |
| *C01B 32/336* | (2017.01) |
| *B01D 53/81* | (2006.01) |
| *B01D 53/10* | (2006.01) |
| *B01D 53/04* | (2006.01) |
| *B01D 53/86* | (2006.01) |

(52) U.S. Cl.
CPC .......... *B01J 20/3204* (2013.01); *B01D 53/02* (2013.01); *B01D 53/64* (2013.01); *B01D 53/81* (2013.01); *B01J 20/20* (2013.01); *B01J 20/28004* (2013.01); *B01J 20/324* (2013.01); *B01J 20/327* (2013.01); *B01J 20/3208* (2013.01); *B01J 20/3234* (2013.01); *B01J 20/3236* (2013.01); *B01J 20/3255* (2013.01); *B01J 20/3276* (2013.01); *B01J 20/3293* (2013.01); *C01B 32/336* (2017.08); *B01D 53/025* (2013.01); *B01D 53/04* (2013.01); *B01D 53/10* (2013.01); *B01D 53/8665* (2013.01); *B01D 2253/102* (2013.01); *B01D 2253/25* (2013.01); *B01D 2253/304* (2013.01); *B01D 2257/602* (2013.01); *B01D 2258/0283* (2013.01)

(58) Field of Classification Search
CPC ...... B01D 53/04; B01D 53/10; B01D 53/025; B01D 53/64; B01D 53/8665; B01D 2253/25; B01D 2253/304; B01D 2253/102; B01D 2258/0283; B01D 2257/602; C01B 31/083; C01B 31/10; B01J 20/324; B01J 20/3236; B01J 20/3293; B01J 20/3208; B01J 20/28004; B01J 20/20; B01J 20/3204
See application file for complete search history.

(56) References Cited

U.S. PATENT DOCUMENTS

| | | |
|---|---|---|
| 1,984,164 A | 12/1934 | Alfred |
| 2,317,857 A | 4/1943 | Soday |
| 2,456,272 A | 12/1948 | Gregory |
| 3,194,629 A | 7/1965 | Dreibelbis et al. |
| 3,341,185 A | 9/1967 | Kennedy, Sr. |
| 3,662,523 A | 5/1972 | Revoir et al. |
| 3,786,619 A | 1/1974 | Melkersson |
| 3,826,618 A | 7/1974 | Capuano |
| 3,849,267 A | 11/1974 | Hilgen et al. |
| 3,876,393 A | 4/1975 | Kasai et al. |
| 3,935,708 A | 2/1976 | Harrewijne et al. |
| 4,013,516 A | 3/1977 | Greenfield et al. |

(Continued)

FOREIGN PATENT DOCUMENTS

| | | |
|---|---|---|
| CA | 1099490 A | 4/1981 |
| CA | 2150529 A1 | 12/1995 |

(Continued)

OTHER PUBLICATIONS

"U.S. Appl. No. 10/554,018 Response filed Nov. 1, 2010 to Final Office Action dated Apr. 27, 2010", 17 pgs.
"U.S. Appl. No. 10/554,018, Final Office Action dated Apr. 27, 2010", 8 pgs.
"U.S. Appl. No. 10/554,018, Non Final Office Action dated Oct. 6, 2009", 8 pgs.
"U.S. Appl. No. 10/554,018, Notice of Allowance dated Jan. 19, 2012", 7 pgs.
"U.S. Appl. No. 10/554,018, Response filed Feb. 8, 2010 to Non Final Office Action dated Oct. 6, 2009", 9 pgs.

(Continued)

*Primary Examiner* — Richard M Rump
(74) *Attorney, Agent, or Firm* — Schwegman Lundberg & Woessner, P.A.

(57) ABSTRACT

The present invention relates to activated carbon sorbents including nitrogen. In various embodiments, the present invention provides an activated carbon sorbent including a halogen- or halide-promoted activated carbon, the activated carbon sorbent particles including nitrogen in a surface layer of the sorbent particles. In various embodiments, the present invention provides a method of reducing the pollutant content in a pollutant-containing gas using the activated carbon sorbent. In various embodiments, the activated carbon sorbent can remove mercury from a mercury-containing gas that includes sulfur(VI) such as $SO_3$ more efficiently than other sorbents.

19 Claims, No Drawings

(56) References Cited

U.S. PATENT DOCUMENTS

| | | | |
|---|---|---|---|
| 4,094,777 A | 6/1978 | Sugier et al. |
| 4,101,631 A | 7/1978 | Ambrosini et al. |
| 4,196,173 A | 4/1980 | DeJong et al. |
| 4,338,896 A | 7/1982 | Papasideris |
| 4,342,192 A | 8/1982 | Heyn et al. |
| 4,500,327 A | 2/1985 | Nishino et al. |
| 4,530,765 A | 7/1985 | Sabherwal |
| 4,699,896 A | 10/1987 | Sing et al. |
| 4,708,853 A | 11/1987 | Matviya et al. |
| 4,772,455 A | 9/1988 | Izumi et al. |
| 4,786,483 A | 11/1988 | Audeh |
| 4,814,152 A | 3/1989 | Yan |
| 4,820,318 A | 4/1989 | Chang et al. |
| 4,889,698 A | 12/1989 | Moller et al. |
| 4,956,162 A | 9/1990 | Smith et al. |
| 5,245,120 A | 9/1993 | Srinivasachar et al. |
| 5,288,306 A | 2/1994 | Aibe et al. |
| 5,300,137 A | 4/1994 | Weyand et al. |
| 5,336,835 A | 8/1994 | McNamara |
| 5,346,674 A | 9/1994 | Weinwurm et al. |
| 5,409,522 A | 4/1995 | Durham et al. |
| 5,419,834 A | 5/1995 | Staten |
| 5,435,980 A | 7/1995 | Felsvang et al. |
| 5,462,908 A | 10/1995 | Liang et al. |
| 5,480,619 A | 1/1996 | Johnson et al. |
| 5,500,306 A | 3/1996 | Hsu et al. |
| 5,505,766 A | 4/1996 | Chang |
| 5,556,447 A | 9/1996 | Srinivasachar et al. |
| 5,569,436 A | 10/1996 | Lerner |
| 5,575,982 A | 11/1996 | Reiss et al. |
| 5,607,496 A | 3/1997 | Brooks |
| 5,672,323 A | 9/1997 | Bhat et al. |
| 5,695,726 A | 12/1997 | Lerner |
| 5,785,935 A | 7/1998 | Fristad et al. |
| 5,827,352 A | 10/1998 | Altman et al. |
| 5,854,173 A | 12/1998 | Chang et al. |
| 5,891,324 A | 4/1999 | Ohtsuka |
| 6,001,762 A | 12/1999 | Harmer et al. |
| 6,013,593 A | 1/2000 | Lee et al. |
| 6,027,551 A | 2/2000 | Hwang et al. |
| 6,074,974 A | 6/2000 | Lee et al. |
| 6,080,281 A | 6/2000 | Attia |
| 6,103,205 A | 8/2000 | Wojtowicz et al. |
| 6,136,072 A | 10/2000 | Sjostrom et al. |
| 6,136,749 A | 10/2000 | Gadkaree et al. |
| 6,214,304 B1 | 4/2001 | Rosenthal et al. |
| 6,258,334 B1 | 7/2001 | Gadkaree et al. |
| 6,284,199 B1 | 9/2001 | Downs et al. |
| 6,342,462 B1 | 1/2002 | Kulprathipanja |
| 6,372,187 B1 | 4/2002 | Madden et al. |
| 6,375,909 B1 | 4/2002 | Dangtran et al. |
| 6,383,981 B1 | 5/2002 | Blankenship et al. |
| 6,471,936 B1 | 10/2002 | Chen et al. |
| 6,475,451 B1 | 11/2002 | Leppin et al. |
| 6,475,471 B1 | 11/2002 | Wehrli |
| 6,528,030 B2 | 3/2003 | Madden et al. |
| 6,558,454 B1 | 5/2003 | Chang et al. |
| 6,576,585 B2 | 6/2003 | Fischer et al. |
| 6,579,507 B2 | 6/2003 | Pahlman et al. |
| 6,596,661 B2 | 7/2003 | Neufert |
| 6,610,263 B2 | 8/2003 | Pahlman et al. |
| 6,638,485 B1 | 10/2003 | Iida et al. |
| 6,719,828 B1 | 4/2004 | Lovell et al. |
| 6,808,692 B2 | 10/2004 | Oehr |
| 6,818,043 B1 | 11/2004 | Chang et al. |
| 6,848,374 B2 | 2/2005 | Srinivasachar et al. |
| 6,878,358 B2 | 4/2005 | Vosteen et al. |
| 6,942,840 B1 | 9/2005 | Broderick |
| 6,953,494 B2 | 10/2005 | Nelson, Jr. |
| 6,960,329 B2 | 11/2005 | Sellakumar |
| 7,017,330 B2 | 3/2006 | Bellows |
| 7,081,434 B2 | 7/2006 | Sinha |
| 7,124,591 B2 | 10/2006 | Baer et al. |
| 7,211,707 B2 | 5/2007 | Axtell et al. |
| 7,247,279 B2 | 7/2007 | Pahlman et al. |
| 7,293,414 B1 | 11/2007 | Huber |
| 7,361,209 B1 | 4/2008 | Durham et al. |
| 7,435,286 B2 | 10/2008 | Olson et al. |
| 7,442,239 B2 | 10/2008 | Armstrong et al. |
| 7,479,263 B2 | 1/2009 | Chang et al. |
| 7,507,083 B2 | 3/2009 | Comrie |
| 7,514,052 B2 | 4/2009 | Lissianski et al. |
| 7,521,032 B2 | 4/2009 | Honjo et al. |
| 7,541,052 B1 | 6/2009 | Cordray |
| 7,544,338 B2 | 6/2009 | Honjo et al. |
| 7,563,311 B2 | 7/2009 | Graham |
| 7,611,564 B2 | 11/2009 | McChesney et al. |
| 7,622,092 B2 | 11/2009 | Honjo et al. |
| 7,722,843 B1 | 5/2010 | Srinivasachar |
| 7,767,174 B2 | 8/2010 | Liu et al. |
| 7,780,765 B2 | 8/2010 | Srinivasachar et al. |
| 7,938,571 B1 | 5/2011 | Irvine |
| 7,942,566 B1 | 5/2011 | Irvine |
| 8,007,749 B2 | 8/2011 | Chang et al. |
| 8,080,088 B1 | 12/2011 | Srinivasachar |
| 8,124,036 B1 | 2/2012 | Baldrey et al. |
| 8,168,147 B2 | 5/2012 | Olson et al. |
| 8,168,149 B2 | 5/2012 | Gal et al. |
| 8,173,566 B2 | 5/2012 | Olson et al. |
| 8,216,535 B2 | 7/2012 | Pollack et al. |
| 8,312,822 B2 | 11/2012 | Holmes et al. |
| 8,512,655 B2 | 8/2013 | Olson et al. |
| 8,652,235 B2 | 2/2014 | Olson et al. |
| 8,715,599 B2 | 5/2014 | Pollack et al. |
| 8,807,056 B2 | 8/2014 | Holmes et al. |
| 8,821,819 B2 | 9/2014 | Olson et al. |
| 9,011,805 B2 | 4/2015 | Olson et al. |
| 9,155,997 B2 | 10/2015 | Holmes et al. |
| 9,468,886 B2 | 10/2016 | Olson et al. |
| 9,662,629 B2 | 5/2017 | Olson et al. |
| 9,669,355 B2 | 6/2017 | Olson et al. |
| 9,675,931 B2 | 6/2017 | Holmes et al. |
| 9,757,689 B2 | 9/2017 | Olson et al. |
| 10,130,930 B2 | 11/2018 | Olson |
| 10,343,114 B2 | 7/2019 | Olson et al. |
| 10,471,412 B2 | 11/2019 | Olson et al. |
| 10,589,225 B2 | 3/2020 | Olson et al. |
| 10,596,517 B2 | 3/2020 | Olson et al. |
| 10,668,430 B2 | 6/2020 | Olson et al. |
| 10,828,596 B2 | 11/2020 | Olson |
| 10,926,218 B2 | 2/2021 | Olson et al. |
| 10,933,370 B2 | 3/2021 | Olson et al. |
| 2001/0002387 A1 | 5/2001 | Tsutsumi et al. |
| 2001/0003116 A1 | 6/2001 | Neufert |
| 2002/0033097 A1 | 3/2002 | El-dhoubary et al. |
| 2002/0043496 A1 | 4/2002 | Boddu et al. |
| 2002/0114749 A1 | 8/2002 | Cole |
| 2002/0134242 A1 | 9/2002 | Yang et al. |
| 2002/0150516 A1 | 10/2002 | Pahlman et al. |
| 2003/0057293 A1 | 3/2003 | Boecking |
| 2003/0104937 A1* | 6/2003 | Sinha ................ B01D 53/02 502/400 |
| 2003/0113239 A1 | 6/2003 | Pahlman et al. |
| 2003/0136509 A1 | 7/2003 | Virtanen |
| 2003/0161771 A1 | 8/2003 | Oehr |
| 2003/0206843 A1 | 11/2003 | Nelson, Jr. |
| 2003/0206846 A1 | 11/2003 | Jangbarwala |
| 2004/0003716 A1 | 1/2004 | Nelson, Jr. |
| 2004/0013589 A1 | 1/2004 | Vosteen et al. |
| 2004/0076570 A1 | 4/2004 | Jia |
| 2004/0086439 A1 | 5/2004 | Vosteen et al. |
| 2004/0109800 A1 | 6/2004 | Pahlman et al. |
| 2004/0244657 A1 | 12/2004 | Srinivasachar et al. |
| 2005/0000197 A1 | 1/2005 | Krantz |
| 2005/0019240 A1 | 1/2005 | Lu et al. |
| 2005/0074380 A1 | 4/2005 | Boren et al. |
| 2005/0147549 A1 | 7/2005 | Lissianski et al. |
| 2005/0227146 A1 | 10/2005 | Ghantous et al. |
| 2005/0274307 A1 | 12/2005 | Lissianski et al. |
| 2006/0048646 A1 | 3/2006 | Olson et al. |
| 2006/0057044 A1 | 3/2006 | Chang et al. |
| 2006/0112823 A1 | 6/2006 | Avina |
| 2006/0191835 A1 | 8/2006 | Petrik et al. |
| 2006/0204418 A1 | 9/2006 | Chao et al. |

(56) References Cited

U.S. PATENT DOCUMENTS

| | | |
|---|---|---|
| 2007/0167309 A1 | 7/2007 | Olson |
| 2007/0168213 A1 | 7/2007 | Comrie |
| 2007/0179056 A1* | 8/2007 | Baek .................. B01D 53/02 502/400 |
| 2007/0180990 A1 | 8/2007 | Downs et al. |
| 2007/0234902 A1 | 10/2007 | Fair et al. |
| 2007/0259781 A1 | 11/2007 | Sinha |
| 2007/0295347 A1 | 12/2007 | Paine, III et al. |
| 2008/0090951 A1 | 4/2008 | Mao et al. |
| 2008/0107579 A1 | 5/2008 | Downs et al. |
| 2008/0134888 A1 | 6/2008 | Chao et al. |
| 2008/0182747 A1 | 7/2008 | Sinha |
| 2008/0207443 A1 | 8/2008 | Gadkaree et al. |
| 2008/0292512 A1 | 11/2008 | Kang |
| 2009/0031708 A1 | 2/2009 | Schmidt |
| 2009/0062119 A1 | 3/2009 | Olson et al. |
| 2009/0081092 A1 | 3/2009 | Yang et al. |
| 2009/0136401 A1 | 5/2009 | Yang et al. |
| 2009/0235848 A1 | 9/2009 | Eiteneer et al. |
| 2009/0297413 A1 | 12/2009 | Olson et al. |
| 2009/0320678 A1 | 12/2009 | Chang et al. |
| 2010/0024642 A1 | 2/2010 | Fukumoto et al. |
| 2010/0047146 A1 | 2/2010 | Olson et al. |
| 2011/0076210 A1 | 3/2011 | Pollack et al. |
| 2011/0168018 A1 | 7/2011 | Mohamadalizadeh et al. |
| 2011/0229388 A1 | 9/2011 | Gadgil et al. |
| 2011/0250111 A1 | 10/2011 | Pollack et al. |
| 2012/0100053 A1 | 4/2012 | Durham et al. |
| 2012/0183458 A1 | 7/2012 | Olson et al. |
| 2012/0244355 A1 | 9/2012 | Pollack et al. |
| 2013/0157845 A1 | 6/2013 | Nalepa et al. |
| 2013/0280156 A1 | 10/2013 | Olson et al. |
| 2014/0056787 A1 | 2/2014 | Olson et al. |
| 2014/0099244 A1 | 4/2014 | Olson et al. |
| 2014/0140908 A1 | 5/2014 | Nalepa et al. |
| 2014/0224121 A1 | 8/2014 | Mimna et al. |
| 2014/0255279 A1 | 9/2014 | Olson et al. |
| 2014/0308188 A1 | 10/2014 | Olson et al. |
| 2015/0098878 A1 | 4/2015 | Olson |
| 2015/0246315 A1 | 9/2015 | Olson et al. |
| 2017/0056853 A1 | 3/2017 | Mimna et al. |
| 2017/0100692 A1 | 4/2017 | Olson et al. |
| 2017/0128908 A1 | 5/2017 | Olson et al. |
| 2017/0173524 A1 | 6/2017 | Olson et al. |
| 2017/0173557 A1 | 6/2017 | Olson et al. |
| 2017/0239644 A1 | 8/2017 | Olson et al. |
| 2018/0133646 A1 | 5/2018 | Pavlish et al. |
| 2018/0229182 A1 | 8/2018 | Olson et al. |
| 2018/0257030 A1 | 9/2018 | Olson et al. |
| 2018/0257031 A1 | 9/2018 | Olson et al. |
| 2018/0280870 A1 | 10/2018 | Olson et al. |
| 2019/0009247 A1 | 1/2019 | Olson et al. |
| 2019/0300143 A1 | 10/2019 | Harrison et al. |
| 2019/0329179 A1 | 10/2019 | Olson et al. |
| 2019/0329215 A1 | 10/2019 | Olson et al. |
| 2019/0336913 A1 | 11/2019 | Olson et al. |

FOREIGN PATENT DOCUMENTS

| | | |
|---|---|---|
| CA | 2327602 A1 | 6/2001 |
| CA | 2400898 A1 | 8/2001 |
| CA | 2584327 A1 | 4/2006 |
| CA | 2757309 A1 | 10/2010 |
| CA | 2757309 C | 1/2017 |
| CA | 2871422 C | 11/2018 |
| CN | 1048173 A | 1/1991 |
| CN | 1933893 A | 3/2007 |
| CN | 101048218 A | 10/2007 |
| CN | 101053820 A | 10/2007 |
| CN | 101293196 A | 10/2008 |
| CN | 101816922 A | 9/2010 |
| CN | 102413899 A | 4/2012 |
| CN | 104519410 A | 4/2015 |
| CN | 105188910 A | 12/2015 |
| CN | 104619410 B | 5/2016 |
| CN | 107661744 A | 2/2018 |
| CN | 105188910 B | 10/2018 |
| DE | 3426059 A1 | 1/1986 |
| DE | 3816600 A1 | 11/1989 |
| DE | 10233173 A1 | 2/2004 |
| DE | 202012003747 U1 | 11/2012 |
| EP | 0208490 A1 | 1/1987 |
| EP | 1386655 A1 | 2/2004 |
| EP | 1458474 | 9/2004 |
| EP | 1570894 A1 | 9/2005 |
| FR | 2529802 | 1/1984 |
| GB | 2122916 A | 1/1984 |
| JP | 4953590 A | 5/1974 |
| JP | 4953593 A | 5/1974 |
| JP | 4966592 A | 6/1974 |
| JP | 4943197 B4 | 11/1974 |
| JP | 506438 B4 | 3/1975 |
| JP | 51003386 A | 1/1976 |
| JP | 544868 A | 1/1979 |
| JP | 50145324 A | 3/1980 |
| JP | 09256812 | 9/1997 |
| KR | 1020027006149 | 7/2002 |
| SU | 732207 A1 | 5/1980 |
| SU | 1163982 A | 6/1985 |
| WO | WO-0162368 A1 | 8/2001 |
| WO | WO-0228513 A2 | 4/2002 |
| WO | WO-03072241 A1 | 9/2003 |
| WO | WO-2004089501 A2 | 10/2004 |
| WO | WO-2004094024 A2 | 11/2004 |
| WO | WO-2006039007 A2 | 4/2006 |
| WO | WO-2006039007 A3 | 4/2006 |
| WO | WO-2006099611 A1 | 9/2006 |
| WO | WO-2009018539 A3 | 2/2009 |
| WO | WO-2010123609 A1 | 10/2010 |
| WO | WO-2012030560 A1 | 3/2012 |
| WO | WO-2013162968 A2 | 10/2013 |
| WO | WO-2013162968 A3 | 10/2013 |
| WO | WO-2014137907 A2 | 9/2014 |

OTHER PUBLICATIONS

"U.S. Appl. No. 10/554,018, Response filed Aug. 10, 2009 to Restriction Requirement dated Jun. 9, 2009", 1 pg.

"U.S. Appl. No. 10/554,018, Restriction Requirement dated Jun. 9, 2009", 5 pgs.

"U.S. Appl. No. 11/209,163, Advisory Action dated Apr. 21, 2008", 3 pgs.

"U.S. Appl. No. 11/209,163, Final Office Action dated Jan. 23, 2008", 20 pgs.

"U.S. Appl. No. 11/209,163, Non Final Office Action dated Aug. 13, 2007", 14 pgs.

"U.S. Appl. No. 11/209,163, Notice of Allowance dated Jul. 14, 2008", 7 pgs.

"U.S. Appl. No. 11/209,163, Preliminary Amendment filed Feb. 27, 2007", 9 pgs.

"U.S. Appl. No. 11/209,163, Response filed Mar. 24, 2008 to Final Office Action dated Jan. 23, 2008", 29 pgs.

"U.S. Appl. No. 11/209,163, Response filed Jul. 9, 2007 to Restriction Requirement dated Jun. 7, 2007", 2 pgs.

"U.S. Appl. No. 11/209,163, Response filed Nov. 13, 2007 to Non Final Office Action dated Aug. 13, 2007", 19 pgs.

"U.S. Appl. No. 11/209,163, Restriction Requirement dated Jun. 7, 2007", 6 pgs.

"U.S. Appl. No. 12/184,860, Examiner Interview Summary dated Apr. 5, 2011", 3 pgs.

"U.S. Appl. No. 12/184,860, Final Office Action dated May 11, 2011", 15 pgs.

"U.S. Appl. No. 12/184,860, Non Final Office Action dated Jan. 19, 2011", 14 pgs.

"U.S. Appl. No. 12/184,860, Response filed Apr. 7, 2011 to Non Final Office Action dated Jan. 19, 2011", 12 pgs.

"U.S. Appl. No. 12/184,860, Response filed Jul. 8, 2011 to Final Office Action dated May 11, 2011", 11 pgs.

(56) References Cited

OTHER PUBLICATIONS

"U.S. Appl. No. 12/201,595, Final Office Action dated Mar. 10, 2010", 13 pgs.
"U.S. Appl. No. 12/201,595, Non Final Office Action dated Apr. 16, 2009", 21 pgs.
"U.S. Appl. No, 12/201,595, Response filed Oct. 16, 2009 to Non Final Office Action dated Apr. 16, 2009", 18 pgs.
"U.S. Appl. No. 12/419,219, Final Office Action dated Oct. 14, 2010", 17 pgs.
"U.S. Appl. No. 12/419,219, Non Final Office Action dated Jan. 15, 2010", 13 pgs.
"U.S. Appl. No. 12/419,219, Non Final Office Action dated Feb. 23, 2011", 17 pgs.
"U.S. Appl. No. 12/419,219, Non Final Office Action dated Aug. 4, 2011", 16 pgs.
"U.S. Appl. No. 12/419,219, Notice of Allowance dated Jan. 10, 2012", 7 pgs.
"U.S. Appl. No. 12/419,219, Preliminary Amendment filed Apr. 6, 2009", 7 pgs.
"U.S. Appl. No. 12/419,219, Response filed Feb. 14, 2011 to Final Office Action dated Oct. 14, 2010", 19 pgs.
"U.S. Appl. No. 12/419,219, Response filed May 20, 2011 to Non Final Office Action dated Feb. 23, 2011", 14 pgs.
"U.S. Appl. No. 12/419,219, Response filed Jul. 15, 2010 to Non Final Office Action dated Jan. 15, 2010", 22 pgs.
"U.S. Appl. No. 12/419,219, Response filed Oct. 27, 2011 to Non Final Office Action dated Aug. 4, 2011", 12 pqs.
"U.S. Appl. No. 12/429,058, Advisory Action dated May 29, 2012", 3 pgs.
"U.S. Appl. No. 12/429,058, Ex Parte Quayle Action dated Feb. 14, 2013", 7 pgs.
"U.S. Appl. No. 12/429,058, Examiner Interview Summary dated Dec. 28, 2012", 4 pgs.
"U.S. Appl. No. 12/429,058, Final Office Action dated Oct. 31, 2012", 21 pgs.
"U.S. Appl. No. 12/429,058, Final Office Action dated Dec. 20, 2011", 21 pgs.
"U.S. Appl. No. 12/429,058, Non Final Office Action dated Jun. 11, 2012", 18 pgs.
"U.S. Appl. No. 12/429,058, Non Final Office Action dated Jul. 9, 2011", 20 pgs.
"U.S. Appl. No. 12/429,058, Notice of Allowance dated Jan. 16, 2014", 5 pgs.
"U.S. Appl. No. 12/429,058, Notice of Allowance dated Sep. 11, 2013", 11 pgs.
"U.S. Appl. No. 12/429,058, Response filed Jan. 31, 2013 to Final Office Action dated Oct. 31, 2012", 19 pgs.
"U.S. Appl. No. 12/429,058, Response filed Mar. 7, 2013 to Ex Parte Quayle Action dated Feb. 14, 2013", 7 pgs.
"U.S. Appl. No. 12/429,058, Response filed May 11, 2012 to Final Office Action dated Dec. 20, 2011", 11 pgs.
"U.S. Appl. No. 12/429,058, Response filed Sep. 11, 2012 to Non Final Office Action dated Jun. 11, 2012", 16 pgs.
"U.S. Appl. No. 12/429,058, Response filed Oct. 18, 2011 to Non Final Office Action dated Jul. 19, 2011", 17 pgs.
"U.S. Appl. No. 13/427,665, Non Final Office Action dated Oct. 4, 2013", 23 pgs.
"U.S. Appl. No. 13/427,665, Non Final Office Action dated Aug. 3, 2012", 12 pgs.
"U.S. Appl. No. 13/427,665, Notice of Allowance dated Apr. 16, 2013", 8 pgs.
"U.S. Appl. No. 13/427,665, Response filed Mar. 21, 2013 to Non Final Office Action dated Jan. 4, 2013", 20 pgs.
"U.S. Appl. No. 13/427,665, Response filed Oct. 10, 2012 to Non Final Office Action dated Aug. 3, 2012", 15 pgs.
"U.S. Appl. No. 13/427,685, Preliminary Amendment filed Mar. 22, 2012", 3 pgs.
"U.S. Appl. No. 13/453,274, Advisory Action dated Nov. 24, 2014", 3 pgs.

"U.S. Appl. No. 13/453,274, Final Office Action dated Oct. 16, 2014", 4 pgs.
"U.S. Appl. No. 13/453,274, Non Final Office Action dated May 30, 2014", 6 pgs.
"U.S. Appl. No. 13/453,274, Notice of Allowance dated Jan. 5, 2015", 5 pgs.
"U.S. Appl. No. 13/453,274, Response filed Sep. 2, 2014 to Non Final Office Action dated May 30, 2014", 13 pgs.
"U.S. Appl. No. 13/453,274, Response filed Nov. 6, 2014 to Final Office Action dated Oct. 16, 2014", 7 pgs.
"U.S. Appl. No. 13/453,274, Response filed Dec. 9, 2014 to Advisory Action dated Nov. 24, 2014", 6 pgs.
"U.S. Appl. No. 13/966,768, Non Final Office Action dated Dec. 6, 2013", 7 pgs.
"U.S. Appl. No. 13/966,768, Notice of Allowability dated Aug. 1, 2014", 6 pgs.
"U.S. Appl. No. 13/966,768, Notice of Allowance dated Apr. 18, 2014", 7 pgs.
"U.S. Appl. No. 13/966,768, Preliminary Amendment filed Aug. 14, 2013", 3 pgs.
"U.S. Appl. No. 13/966,768, Response filed Mar. 6, 2014 to Non Final Office Action dated Dec. 6, 2013", 6 pgs.
"U.S. Appl. No. 13/966,768, Supplemental Preliminary Amendment filed Aug. 15, 2013", 6 pgs.
"U.S. Appl. No. 14/102,896, Advisory Action dated Dec. 16, 2015", 3 pgs.
"U.S. Appl. No. 14/102,896, Final Office Action dated Aug. 26, 2015", 12 pgs.
"U.S. Appl. No. 14/102,896, Non Final Office Action dated Mar. 23, 2015", 13 pgs.
"U.S. Appl. No. 14/102,896, Notice of Allowance dated Jun. 10, 2016", 7 pgs.
"U.S. Appl. No. 14/102,896, Response filed Jan. 22, 2016 to Advisory Action dated Dec. 16, 2015", 11 pgs.
"U.S. Appl. No. 14/102,896, Response filed Jun. 22, 2015 to Non Final Office Action dated Mar. 23, 2015", 10 pgs.
"U.S. Appl. No. 14/102,896, Response filed Nov. 24, 2015 to Final Office Action dated Aug. 26, 2015", 5 pgs.
"U.S. Appl. No. 14/195,360, Corrected Notice of Allowance dated Feb. 27, 2017", 2 pgs.
"U.S. Appl. No. 14/195,360, Corrected Notice of Allowance dated Mar. 29, 2017", 2 pgs.
"U.S. Appl. No. 14/195,360, Final Office Action dated Mar. 18, 2016", 18 pgs.
"U.S. Appl. No. 14/195,360, Final Office Action dated Nov. 22, 2016", 7 pgs.
"U.S. Appl. No. 14/195,360, Non Final Office Action dated Jun. 20, 2016", 11 pgs.
"U.S. Appl. No. 14/195,360, Non Final Office Action dated Nov. 24, 2015", 19 pgs.
"U.S. Appl. No. 14/195,360, Notice of Allowance dated Feb. 7, 2017", 5 pgs.
"U.S. Appl. No. 14/195,360, Response filed Jan. 18, 2017 to Final Office Action dated Nov. 22, 2016", 7 pgs.
"U.S. Appl. No. 14/195,360, Response filed Feb. 22, 2016 to Non Final Office Action dated Nov. 24, 2015", 21 pgs.
"U.S. Appl. No. 14/195,360, Response filed May 17, 2016 to Final Office Action dated Mar. 18, 2016", 15 pgs.
"U.S. Appl. No. 14/318,270, Advisory Action dated Feb. 17, 2017", 4 pgs.
"U.S. Appl. No. 14/318,270, Corrected Notice of Allowance dated May 22, 2017", 2 pgs.
"U.S. Appl. No. 14/318,270, Final Office Action dated Nov. 25, 2016", 25 pgs.
"U.S. Appl. No. 14/318,270, Non Final Office Action dated Jun. 2, 2016", 24 pgs.
"U.S. Appl. No. 14/318,270, Notice of Allowance dated May 15, 2017", 8 pgs.
"U.S. Appl. No. 14/318,270, Response filed 01-25-17 to Final Office Action dated Nov. 25, 2016", 14 pgs.
"U.S. Appl. No. 14/318,270, Response filed Feb. 27, 2017 to Final Office Action dated Nov. 25, 2016", 15 pgs.

(56) References Cited

OTHER PUBLICATIONS

"U.S. Appl. No. 14/318,270, Response filed Mar. 2, 2016 to Restriction Requirement dated Jan. 14, 2016", 9 pgs.
"U.S. Appl. No. 14/318,270, Response filed Aug. 22, 2016 to Non Final Office Action dated Jun. 2, 2016", 14 pgs.
"U.S. Appl. No. 14/318,270, Restriction Requirement dated Jan. 14, 2016", 8 pgs.
"U.S. Appl. No. 14/564,860, Final Office Action dated Nov. 17, 2016", 4 pgs.
"U.S. Appl. No. 14/564,860, Non Final Office Action dated Jul. 12, 2016", 6 pgs.
"U.S. Appl. No. 14/564,860, Notice of Allowance dated Jan. 30, 2017", 6 pgs.
"U.S. Appl. No. 14/564,860, Preliminary Amendment filed Dec. 10, 2014", 8 pgs.
"U.S. Appl. No. 14/564,860, Preliminary Amendment filed Dec. 10, 2014", 6 pgs.
"U.S. Appl. No. 14/564,860, Response filed May 6, 2016 to Restriction Requirement dated Mar. 16, 2016", 9 pgs.
"U.S. Appl. No. 14/564,860, Response filed Oct. 3, 2016 to Non Final Office Action dated Jul. 12, 2016", 11 pgs.
"U.S. Appl. No. 14/564,860, Restriction Requirement dated Mar. 16, 2016", 5 pgs.
"U.S. Appl. No. 14/712,558, Advisory Action dated Feb. 12, 2018", 8 pgs.
"U.S. Appl. No. 14/712,558, Amendment and Response filed Dec. 3, 2018 to Non Final Office Action dated Oct. 19, 2018", 28 pgs.
"U.S. Appl. No. 14/712,558, Examiner Interview Summary dated Mar. 5, 2018", 3 pgs.
"U.S. Appl. No. 14/712,558, Final Office Action dated Jan. 11, 2019", 27 pgs.
"U.S. Appl. No. 14/712,558, Final Office Action dated Dec. 6, 2017", 9 pgs.
"U.S. Appl. No. 14/712,558, Non Final Office Action dated Jul. 2, 2018", 16 pgs.
"U.S. Appl. No. 14/712,558, Non Final Office Action dated Jul. 6, 2017", 7 pgs.
"U.S. Appl. No. 14/712,558, Non Final Office Action dated Sep. 12, 2019", 15 pgs.
"U.S. Appl. No. 14/712,558, Non Final Office Action dated Oct. 19, 2018", 26 pgs.
"U.S. Appl. No. 14/712,558, Response filed Jan. 23, 2018 to Final Office Action dated Dec. 6, 2017", 13 pgs.
"U.S. Appl. No. 14/712,558, Response filed Apr. 2, 2018 to Final Office Action dated Dec. 6, 2017", 7 pgs.
"U.S. Appl. No. 14/712,558, Response filed Jul. 10, 2019 to Final Office Action dated Jan. 11, 2019", 57 pgs.
"U.S. Appl. No. 14/712,558, Response filed Aug. 14, 2018 to Non Final Office Action dated Jul. 2, 2018", 11 pgs.
"U.S. Appl. No. 14/712,558, Response filed Oct. 6, 2017 to Non Final Office Action dated Jul. 6, 2017", 12 pgs.
"U.S. Appl. No. 14/712,558, Supplemental Amendment filed Jun. 13, 2018", 14 pgs.
"U.S. Appl. No. 14/712,558, Supplemental Amendment Filed May 15, 2018", 6 pgs.
"U.S. Appl. No. 14/712,558, Supplemental Preliminary Amendment filed May 15, 2015", 6 pgs.
"U.S. Appl. No. 15/974,343, Preliminary Amendment filed May 15, 2018", 7 pgs.
"U.S. Appl. No. 15/978,760, Preliminary Amendment filed May 15, 2018", 7 pgs.
"U.S. Appl. No. 15/295,594, Non Final Office Action dated Oct. 23, 2018", 20 pgs.
"U.S. Appl. No. 15/295,594, Preliminary Amendment filed Jan. 26, 2017", 8 pgs.
"U.S. Appl. No. 15/295,594, Preliminary Amendment filed Jun. 13, 2017", 7 pgs.
"U.S. Appl. No. 15/295,594, Response filed Jul. 3, 2018 to Restriction Requirement dated May 22, 2018", 9 pgs.
"U.S. Appl. No. 15/295,594, Response filed Jul. 24, 2018 to Restriction Requirement dated Jun. 29, 2018", 9 pgs.
"U.S. Appl. No. 15/295,594, Response filed Apr. 23, 2019 to Non Final Office Action dated Oct. 23, 2018", 45 pgs.
"U.S. Appl. No. 15/295,594, Restriction Requirement dated May 22, 2018", 6 pgs.
"U.S. Appl. No. 15/295,594, Restriction Requirement dated Jul. 29, 2018", 5 pgs.
"U.S. Appl. No. 15/295,594, Supplemental Amendment filed May 15, 2018", 10 pgs.
"U.S. Appl. No. 15/382,114, Final Office Action dated Jun. 21, 2019", 31 pgs.
"U.S. Appl. No. 15/382,114, Non Final Office Action dated Dec. 12, 2018", 46 pgs.
"U.S. Appl. No. 15/382,114, Preliminary Amendment filed Apr. 4, 2017", 3 pgs.
"U.S. Appl. No. 15/382,114, Response filed Sep. 12, 2018 to Restriction Requirement dated Aug. 28, 2018", 8 pgs.
"U.S. Appl. No. 15/382,114, Response filed Mar. 12, 2019 to Non Final Office Action dated Dec. 12, 2018", 24 pgs.
"U.S. Appl. No. 15/382,114, Restriction Requirement dated Aug. 28, 2018", 9 pgs.
"U.S. Appl. No. 15/449,112, Advisory Action dated Apr. 24, 2018", 3 pgs.
"U.S. Appl. No. 15/449,112, Final Office Action dated Feb. 15, 2018", 13 pgs.
"U.S. Appl. No. 15/449,112, Non Final Office Action dated Sep. 27, 2017", 17 pgs.
"U.S. Appl. No. 15/449,112, Notice of Allowance dated Jul. 12, 2018", 8 pgs.
"U.S. Appl. No. 15/449,112, Response filed Jan. 16, 2018 to Non Final Office Action dated Sep. 27, 2017", 16 pgs.
"U.S. Appl. No. 15/449,112, Response filed Feb. 15, 2018 to Final Office Action dated Feb. 15, 2018", 13 pgs.
"U.S. Appl. No. 15/449,112, Response filed Apr. 6, 2018 to Final Office Action dated Feb. 15, 2018", 13 pgs.
"U.S. Appl. No. 15/452,527, Final Office Action dated Dec. 20, 2018", 4 pgs.
"U.S. Appl. No. 15/452,527, Non Final Office Action dated Jun. 3, 2019", 4 pgs.
"U.S. Appl. No. 15/452,527, Non Final Office Action dated Jul. 19, 2018", 6 pgs.
"U.S. Appl. No. 15/452,527, Preliminary Amendment filed Mar. 8, 2017", 3 pgs.
"U.S. Appl. No. 15/452,527, Response filed Mar. 20, 2019 to Final Office Action dated Dec. 20, 2018", 11 pgs.
"U.S. Appl. No. 15/452,527, Response filed Oct. 4, 2018 to Non Final Office Action dated Jul. 19, 2018", 8 pgs.
"U.S. Appl. No. 15/589,359, Advisory Action dated May 22, 2019", 3 pgs.
"U.S. Appl. No. 15/589,359, Amendment and Response filed Jan. 17, 2019 to Non Final Office Action dated Oct. 22, 2018", 14 pgs.
"U.S. Appl. No. 15/589,359, Corrected Notice of Allowability dated Oct. 11, 2019", 2 pgs.
"U.S. Appl. No. 15/589,359, Final Office Action dated Mar. 1, 2019", 10 pgs.
"U.S. Appl. No. 15/589,359, Final Office Action dated Jun. 4, 2018", 13 pgs.
"U.S. Appl. No. 15/589,359, Final Office Action dated Sep. 12, 2018", 14 pgs.
"U.S. Appl. No. 15/589,359, Non Final Office Action dated Feb. 21, 2018", 15 pgs.
"U.S. Appl. No. 15/589,359, Non Final Office Action dated Jun. 21, 2019", 7 pgs.
"U.S. Appl. No. 15/589,359, Non Final Office Action dated Oct. 22, 2018", 12 pgs.
"U.S. Appl. No. 15/589,359, Notice of Allowance dated Jul. 31, 2019", 7 pgs.
"U.S. Appl. No. 15/589,359, Preliminary Amendment filed Jan. 3, 2018", 6 pgs.
"U.S. Appl. No. 15/589,359, Response filed Apr. 30, 2019 to Final Office Action dated Mar. 1, 2019", 11 pgs.

(56) References Cited

OTHER PUBLICATIONS

"U.S. Appl. No. 15/589,359, Response filed May 18, 2018 to Non Final Office Action dated Feb. 21, 2018", 14 pgs.
"U.S. Appl. No. 15/589,359, Response filed Jul. 16, 2019 to Non Final Office Action dated Jun. 21, 2019", 7 pgs.
"U.S. Appl. No. 15/589,359, Response filed Jul. 26, 2018 to Non Final Office Action dated Jun. 4, 2018", 14 pgs.
"U.S. Appl. No. 15/589,359, Response filed Sep. 14, 2018 to Final Office Action dated Sep. 12, 2018", 18 pgs.
"U.S. Appl. No. 15/974,343, Amendment and Response filed Dec. 3, 2018 to Non Final Office Action dated Oct. 29, 2018", 37 pgs.
"U.S. Appl. No. 15/974,343, Final Office Action dated Jan. 14, 2019", 25 pgs.
"U.S. Appl. No. 15/974,343, Non Final Office Action dated Jul. 27, 2018", 12 pgs.
"U.S. Appl. No. 15/974,343, Non Final Office Action dated Oct. 29, 2018", 22 pgs.
"U.S. Appl. No. 15/974,343, Notice of Allowance dated Sep. 17, 2019", 7 pgs.
"U.S. Appl. No. 15/974,343, Response filed Aug. 14, 2018 to Non Final Office Action dated Jul. 27, 2018", 11 pgs.
"U.S. Appl. No. 15/978,760, Response filed Jul. 13, 2018 to Non Final Office Action dated Jun. 29, 2018", 12 pgs.
"U.S. Appl. No. 15/978,760, Amendment and Response filed Dec. 3, 2018 to Non Final Office Action dated Oct. 10, 2018", 25 pgs.
"U.S. Appl. No. 15/978,760, Ex Parte Quayle Action dated Apr. 19, 2019", 13 pgs.
"U.S. Appl. No. 15/978,760, Final Office Action dated Dec. 26, 2018", 21 pgs.
"U.S. Appl. No. 15/978,760, Non Final Office Action dated Jun. 29, 2018", 9 pgs.
"U.S. Appl. No. 15/978,760, Non Final Office Action dated Oct. 10, 2018", 17 pgs.
"U.S. Appl. No. 15/978,760, Notice of Allowability dated May 30, 2019", 3 pgs.
"U.S. Appl. No. 15/978,760, Notice of Allowance dated May 8, 2019", 7 pgs.
"U.S. Appl. No. 15/978,760, Response filed Mar. 20, 2019 to Final Office Action dated Dec. 26, 2018", 90 pgs.
"U.S. Appl. No. 15/978,760, Response filed Apr. 23, 2019 to Ex Parte Quayle Action dated Apr. 19, 2019", 15 pgs.
"U.S. Appl. No. 15/997,091, Final Office Action dated Jan. 11, 2019", 20 pgs.
"U.S. Appl. No. 15/997,091, Non Final Office Action dated Jul. 27, 2018", 13 pgs.
"U.S. Appl. No. 15/997,091, Non Final Office Action dated Nov. 2, 2018", 27 pgs.
"U.S. Appl. No. 15/997,091, Response filed Jul. 10, 2019 to Final Office Action dated Jan. 11, 2019", 80 pgs.
"U.S. Appl. No. 15/997,091, Response filed Dec. 3, 2018 Non Final Office Action dated Nov. 2, 2018", 40 pgs.
"U.S. Appl. No. 15/997,091, Response filed Aug. 14, 2018 to Non Final Office Action dated Jul. 27, 2018", 10 pgs.
"U.S. Appl. No. 16/509,071, Non Final Office Action dated Sep. 11, 2019", 21 pgs.
"U.S. Appl. No. PCT/US04/12828, International Search Report dated Oct. 22, 2004", 2 pgs.
"Application Serial No. PCT/US2014/019916, International Preliminary Report on Patentability dated Sep. 17, 2015", 14 pgs.
"U.S. Appl. No. 14/195,360, Response filed Sep. 16, 2016 to Non Final Office Action dated Jun. 30, 2016", 12 pgs.
"Bromine and its Compounds", Jolles, Z. E., Editor, Academic Press, Inc., New York, NY, (1966), pp. 193 and 205.
"Canadian Application Serial No. 2,523,132, Office Action dated Jul. 18, 2011", 3 pgs.
"Canadian Application Serial No. 2,523,132, Response filed Jan. 16, 2012 to Office Action dated Jul. 18, 2011", 5 pgs.
"Canadian Application Serial No. 2,584,327, Office Action dated Mar. 3, 2009", 4 pgs.
"Canadian Application Serial No. 2,584,327, Office Action dated Dec. 7, 2009", 2 pgs.
"Canadian Application Serial No. 2,584,327, Response filed Mar. 19, 2010 to Office Action dated Dec. 7, 2009", 8 pgs.
"Canadian Application Serial No. 2,584,327, Response filed Sep. 2, 2009 to Office Action dated Mar. 3, 2009", 21 pgs.
"Canadian Application Serial No. 2,707,363, First Examiners Report Received Jun. 16, 2011", 2 pgs.
"Canadian Application Serial No. 2,757,309, Office Action dated Dec. 7, 2015", 3 pgs.
"Canadian Application Serial No. 2,757,309, Response filed Jun. 6, 2016 to Office Action dated Dec. 7, 2015", 13 pgs.
"Canadian Application Serial No. 2,757,309, Voluntary Amendment filed Jan. 30, 2015", 27 pgs.
"Canadian Application Serial No. 2,871,422, Response filed Feb. 26, 2016 to Office Action dated Sep. 9, 2015", 13 pgs.
"Canadian Application Serial No. 2,871,422, Office Action dated Apr. 2, 2015", 5 pgs.
"Canadian Application Serial No. 2,871,422, Office Action dated Apr. 24, 2018", 4 pgs.
"Canadian Application Serial No. 2,871,422, Office Action dated Aug. 31, 2017", 4 pgs.
"Canadian Application Serial No. 2,871,422, Office Action dated Sep. 9, 2015", 3 pgs.
"Canadian Application Serial No. 2,871,422, Office Action dated Dec. 22, 2016", 5 pgs.
"Canadian Application Serial No. 2,871,422, Response filed Feb. 26, 2018 to Office Action dated Aug. 31, 2017", w/ Amended Claims, 53 pgs.
"Canadian Application Serial No. 2,871,422, Response filed Jun. 21, 2017 to Office Action dated Dec. 22, 2016", 41 pgs.
"Canadian Application Serial No. 2,871,422, Response filed Aug. 7, 2018 to Office Action dated Apr. 24, 2018", w/ English Claims, 50 pgs.
"Canadian Application Serial No. 2,871,422, Response filed Aug. 28, 2015 to Canadian Office Action dated Apr. 2, 2015", 22 pgs.
"Canadian Application Serial No. 2,904,039, Office Action dated Feb. 18, 2019", 6 pgs.
"Chinese Application Serial No. 200480017704.4, Office Action dated Dec. 8, 2011", (w/ English Translation), 6 pgs.
"Chinese Application Serial No. 200480017704,4, Response filed Jan. 20, 2012 to Office Action dated Dec. 8, 2012", (w/ English Translation of Amended Claims), 10 pgs.
"Chinese Application Serial No. 200580037037.0, Chinese Office Action, dated Jun. 25, 2013", w/o English Translation, 46 pgs.
"Chinese Application Serial No. 201380033231.6, Office Action dated Sep. 21, 2015", w/ Partial English Translation, 6 pgs.
"Chinese Application Serial No. 201380033231.6, Response filed Jan. 14, 2016 to Office Action dated Sep. 21, 2015", w/ English Claims, 7 pgs.
"Chinese Application Serial No. 201480025701.9, Office Action dated Jan. 16, 2018", (w/ English Translation), 8 pgs.
"Chinese Application Serial No. 201480025701.9, Office Action dated Jul. 12, 2017", w/ English Translation, 8 pgs.
"Chinese Application Serial No. 201480025701.9, Office Action dated Jul. 25, 2016", (w/ English Translation), 4 pgs.
"Chinese Application Serial No. 201480025701,9, Office Action dated Dec. 23, 2016", w/ English Translation, 39 pgs.
"Chinese Application Serial No. 201480025701.9, Office Action dated Dec. 23, 2016", 24 pgs.
"Chinese Application Serial No. 201480025701.9, Response filed Mar. 27, 2018 to Office Action dated Jan. 16, 2018", w/ English Claims, 20 pgs.
"Chinese Application Serial No. 201480025701.9, Response filed Sep. 15, 2017 to Office Action dated Jul. 12, 2017", w/ English Translation, 21 pgs.
"Control of Mercury Emissions from Coal Fired Electric Utility Boilers: An Update", US EPA Air Pollution Prevention and Control Division, National Risk Management Research Laboratory, Office of Research and Development, (Feb. 18, 2005), 59 pgs.
"DARCO® FGD—Powdered Activated Carbon", Norit Americas Inc. Datasheet No. 1100, (May 2009), 1 pg.

(56) References Cited

OTHER PUBLICATIONS

"Database WPI Week 197450", Thomson Scientific, London, GB; AN 1974-86199VXP002514926, 1 pg.
"European Application Serial No. 05814011.2, Response filed Sep. 9, 2011 to European Search Report dated Apr. 14, 2009 and Office Action dated Nov. 5, 2009", 20 pgs.
"European Application Serial No. 05814011.2, Communication Pursuant to Article 94(3) EPC dated Nov. 5, 2009", 4 pgs.
"European Application Serial No. 05814011.2, Decision to grant dated Jun. 8, 2012", 2 pgs.
"European Application Serial No. 05814011.2, Extended European Search Report dated Apr. 14, 2009", 13 pgs.
"European Application Serial No. 05814011.2, Office Action dated Jan. 25, 2008", 2 pgs.
"European Application Serial No. 05814011.2, Office Action dated Jan. 31, 2012", 4 pgs.
"European Application Serial No. 05814011,2, Office Action dated Apr. 27, 2012", 6 pgs.
"European Application Serial No. 05814011.2, Office Action dated Nov. 5, 2009", 2 pgs.
"European Application Serial No. 05814011.2, Partial European Search Report dated Apr. 14, 2009", 13 pgs.
"European Application Serial No. 05814011.2, Response filed Feb. 28, 2012 to Office Action dated Jan. 31, 2012", 30 pgs.
"European Application Serial No. 05814011,2, Response filed Apr. 18, 2008 to Office Action dated Jan. 25, 2008 and Third Party Observations submitted Dec. 4, 2007", 7 pgs.
"European Application Serial No. 05814011.2, Response filed May 11, 2010 to Communication Pursuant to Article 94(3) EPC dated Nov. 5, 2009", 11 pgs.
"European Application Serial No. 05814011.2, Response filed May 11, 2010 to Office Action dated Nov. 5, 2009", 11 pgs.
"European Application Serial No. 05814011.2, Response filed Sep. 9, 2011 to Extended European Search Report dated Apr. 14, 2009", 20 pgs.
"European Application Serial No. 05814011.2, Third Party Observations submitted Mar. 19, 2012", 7 pgs.
"European Application Serial No. 05814011.2, Third Party Observations submitted Dec. 4, 2007", 5 pgs.
"European Application Serial No. 10767465.7, Decision to grant dated Apr. 17, 2014", 2 pgs.
"European Application Serial No. 10767465.7, Extended European Search Report dated Dec. 6, 2012", 5 pgs.
"European Application Serial No. 10767465.7, Intention to Grant dated Mar. 17, 2014", 44 pgs.
"European Application Serial No. 10767465.7, Intention to Grant dated Sep. 30, 2013", 44 pgs.
"European Application Serial No. 10767465.7, Response filed Feb. 3, 2014 to Intention to Grant dated Sep. 30, 2013", 11 pgs.
"European Application Serial No. 10767465.7, Response filed Jun. 20, 2013 to Extended European Search Report dated Jun. 12, 2012", 18 pgs.
"European Application Serial No. 10767465.7, Supplementary European Search Report dated Dec. 6, 2012", 2 pgs,.
"European Application Serial No. 11189249.3, Communication Pursuant to Article 94(3) EPC dated Nov. 26, 2012", 4 pgs.
"European Application Serial No. 11189249.3, Decision to Refuse dated Dec. 19, 2013", 18 pgs.
"European Application Serial No. 11189249.3, Extended European Search Report dated Feb. 1, 2012", 7 pgs.
"European Application Serial No. 11189249,3, Office Action dated Nov. 4, 2013", 4 pgs.
"European Application Serial No. 11189249.3, Response filed Feb. 4, 2013 to Communication Pursuant to Article 94(3) EPC dated Nov. 26, 2021", 9 pgs.
"European Application Serial No. 11189249.3, Response filed Aug. 28, 2012 to Extended European Search Report dated Feb. 1, 2012", 9 pgs.
"European Application Serial No. 11189249.3, Summons to Attend Oral Proceedings mailed Apr. 15, 2013", 7 pgs.
"European Application Serial No. 11189252.7, Communication Pursuant to Article 94(3) EPC dated Jan. 9, 2013", 4 pgs.
"European Application Serial No. 11189252,7, Decision to grant dated May 2, 2014", 2 pgs.
"European Application Serial No. 11189252.7, Extended European Search Report dated Jan. 23, 2012", 6 pgs.
"European Application Serial No. 11189252,7, Extended European Search Report dated May 9, 2012", 12 pgs.
"European Application Serial No. 11189252.7, Office Action dated Oct. 30, 2013", 4 pgs.
"European Application Serial No. 11189252.7, Office Action dated Dec. 11, 2013", 6 pgs.
"European Application Serial No. 11189252.7, Response filed Feb. 11, 2013 to Communication Pursuant to Article 94(3) EPC dated Jan. 9, 2013", 5 pgs.
"European Application Serial No. 11189252.7, Response filed Oct. 10, 2013 to Office Action dated Apr. 15, 2013", 18 pgs.
"European Application Serial No. 11189252.7, Response filed Nov. 22, 2012 to Extended European Search Report dated May 9, 2012", 13 pgs.
"European Application Serial No. 11189252.7, Summons to Attend Oral Proceedings dated Apr. 15, 2013", 6 pgs.
"European Application Serial No. 13719338.9, Notification Regarding Rule 164 and Article 94(3) EPC dated Apr. 24, 2017", 8 pgs.
"European Application Serial No. 13719338.9, Office Action dated May 12, 2017", 6 pgs.
"European Application Serial No. 13719338.9, Office Action dated Dec. 19, 2014", 2 pgs.
"European Application Serial No. 13719338.9, Response filed Jun. 29, 2015 to Office Action dated Dec. 19, 2014", 19 pgs.
"European Application Serial No. 13719338.9, Response filed Sep. 4, 2017 to Notification Regarding Rule 164 and Article 94(3) EPC dated Apr. 24, 2017", 7 pgs.
"European Application Serial No. 14711106.6, Communication Pursuant to Article 94(3) EPC dated Feb. 22, 2017", 6 pgs.
"European Application Serial No. 14711106.6, Office Action dated Jun. 5, 2018", 16 pgs.
"European Application Serial No. 14711106,6, Response filed Aug. 17, 2017 to Communication Pursuant to Article 94(3) EPC dated Feb. 22, 2017", 10 pgs.
"European Application Serial No. 14711106.6, Response filed Oct. 15, 2018 to Office Action dated Jun. 5, 2018", w/ English Claims, 15 pgs.
"International Application No. PCT/US2008/071986, International Search Report dated Jan. 30, 2009", 3 pgs.
"International Application Serial No. PCT/US2005/030018, International Preliminary Report on Patentability dated Dec. 27, 2006", 3 pgs.
"International Application Serial No. PCT/US2005/030018, International Search Report dated Jul. 25, 2006", 2 pgs.
"International Application Serial No. PCT/US2005/030018, Written Opinion dated Jul. 25, 2006", 3 pgs.
"International Application Serial No. PCT/US2010/022807, International Preliminary Report on Patentability dated Nov. 3, 2011", 6 pgs.
"International Application Serial No. PCT/US2010/022807, International Search Report dated Sep. 13, 2010", 3 pgs.
"International Application Serial No. PCT/US2010/022807, Written Opinion dated Sep. 13, 2010", 4 pgs.
"International Application Serial No. PCT/US2013/036964, International Preliminary Report on Patentability dated Jul. 17, 2014", 11 pgs.
"International Application Serial No. PCT/US2013/036964, International Search Report dated Nov. 29, 2013", 7 pgs.
"International Application Serial No. PCT/US2013/036964, Invitation to Pay Additional Fees and Partial Search Report dated Aug. 2, 2013", 7 pgs.
"International Application Serial No. PCT/US2013/036964, Written Opinion dated Apr. 15, 2014", 10 pgs.
"International Application Serial No. PCT/US2013/036964, Written Opinion dated Nov. 29, 2013", 13 pgs.
"International Application Serial No. PCT/US2014/019916, International Search Report dated Oct. 13, 2014", 6 pgs.

(56) References Cited

OTHER PUBLICATIONS

"International Application Serial No. PCT/US2014/019916, Invitation to Pay Additional Fees and Partial Search Report dated May 30, 2014", 6 pgs.

"International Application Serial No. PCT/US2014/019916, Written Opinion dated Oct. 13, 2014", 13 pgs.

"Powdered Activated Carbon", Cabot Corp, [Online] retrieved from the internet: <http://www.cabotcorp.com/solutions/products-plus/activated-carbon/powdered>, (Jan. 3, 2015), 3 pgs.

"Sorbent Enhancement Additives for Mercury Control", US DOE Office of Fossil Energy, National Energy Technology Laboratory, (Jun. 2008), 4 pgs.

Arenillas, A, et al., "CO2 removal potential of carbons prepared by co-pyrolysis of sugar and nitrogen containing compounds", Journal of Analytical and Applied Pyrolysis 74.1, (2005), 298-306.

Bakandritsos, A., et al., "Aqueous and Gaseous Adsorption from Montmorillonite-Carbon Composites and from Derived Carbons", Langmuir, 21, (2005), 2349-2355.

Bakandritsos, A., et al., "High Surface Area Montmorillonite—Carbon Composites and Derived Carbons", Chemistry of Materials, vol. 16, No. 8, (Mar. 16, 2004), 1551-1559.

Benson, Steven A., et al., "JV Task 73—Mercury Control Technologies for Electric Utilities Burning Subbituminous Coals—Draft Final Report", University of North Dakota Energy and Environmental Research Center, (Jun. 2005), 165 pgs.

Benson, Steven A., et al., "Pilot-and Full-Scale Demonstration of Advanced Mercury Control Technologies for Lignite-Fired Power Plants", University of North Dakota Energy and Environmental Research Center, (Feb. 2005), 97 pgs.

Berry, Mark, et al., "Mercury control evaluation of calcium bromide injection into a PRB-fired furnace with an SCR", Proc. of the Air Quality VI Conference, Arlington, VA, (2007), 9 pgs.

Bimer, Jan, et al., "Modified active carbons from precursors enriched with nitrogen functions: sulfur removal capabilities", (1998), 519-525.

Brown, Thomas D., et al., "Mercury Measurement and Its Control: What We Know, Have Learned, and Need to Further Investigate", Journal of the Air and Waste Management Association, 49(6), (Jun. 1999), 98 pgs.

Chang, Shih-Ger, "Method for Oxidation of Mercury Vapor", U.S. Appl. No. 60/560,904, filed Apr. 9, 2004, (Apr. 9, 2004), 9 pgs.

Criswell, Gordon, et al., "Progress Report on Mercury Control Retrofit at the Colstrip Power Station", Paper #91, Mega Symposium, Baltimore, MD, (Aug. 2011), 1-23.

Darder, M., et al., "Caramel-clay nanocomposites", Journal of Materials Chemistry, 15, (2005), 3913-3918.

Diamantopoulou, Ir., et al., "Sorption of mercury by activated carbon in the presence of flue gas components", Fuel Processing Technology 91,2, (2010), 158-163.

Dong, J., et al., "Mercury Removal from Flue Gases by Novel Regenerable Magnetic Nanocomposite Sorbents", Environ. Sci. Technol., 43, (2009), 3266-3271.

Dunham, G. E., et al., "Mercury Capture by an Activated Carbon in a Fixed-Bed Bench-Scale System", Environmental Progress, 17(3), (1998), 203-208.

Eisazadeh, H,, "Removal of Mercury from Water Using Polypyrrole and its Composites", Chinese Journal of Polymer Science, 25(4), (2007), 393-397.

Feeley, Thomas J., et al., "A Review of DOE/NETL's Mercury Control Technology R and D Program for Coal-Fired Power Plants", DOE/NETL Hg R and D Program Review, (Apr. 2003), 32 pgs.

Felsvang, K., et al., "Mercury Reduction and Control Options", The U.S. EPA-DOE-EPRI Combined Power Plant Air Pollutant Control Symposium; The Mega Symposium and The A&WMA Specialty Conference and Mercury Emissions: Fate, Effects and Control; Chicago, IL, (Aug. 2001), 1-19.

Fernandez-Saavedra, R., et al., "Polymer-Clay Nanocomposites as Precursors of Nanostructured Carbon Materials for Electrochemical Devices: Templating Effect of Clays", Journal of Nanoscience and Nanotechnology, 8, (2008), 1741-1750.

French, Charles L., et al., "Study of Hazardous Air Pollutant Emissions from Electric Utility Steam Generating Units—Final Report to Congress: vol. 1", US EPA Office of Air Quality Planning and Standards, (Feb. 1998), 502 pgs.

Ghorbani, M., et al., "Application of polyaniline nanocomposite coated on rice husk ash for removal of Hg(II) from aqueous media", Synthetic Metals, (2011), 4 pgs.

Ghorishi, Behrooz S., et al., "In-Flight Capture of Elemental Mercury by Chlorine-Impregnated Activated Carbon", Proc. of the 94th Annual Meeting of the Air and Waste Management Association, Orlando, FL, (Jun. 2001), 14 pgs.

Ghorishi, Behrooz, et al., "Sorption of Mercury Species by Activated Carbons and Calcium-Based Sorbents: Effect of Temperature, Mercury Concentration and Acid Gases", Waste Manage. Res., 16:6, (1998), 582-593.

Gomez-Aviles, A., et al., "Functionalized Carbon-Silicates from Caramel-Sepiolite Nanocomposites", Angew. Chem. Int. Ed., 46, (2007), 923-925.

Gomez-Aviles, A., et al., "Multifunctional materials based on graphene-like/sepiolite nanocomposites", Applied Clay Science, 47, (2010), 203-211.

Ha, et al., "Effect of unburnt carbon on the corrosion performance of fly ash cement mortar", Construction and Building Materials, (Sep. 1, 2005), 7 pgs.

Ikeue, K., et al., "Noble-metal-containing nano porous carbon synthesized within the interlayer space of montmorillonite and its catalytic property", Applied Catalysis A: General, 351, (2008), 68-74.

Jones, Andrew P., et al., "DOE/NETL's Phase II Mercury Control Technology Field Testing Program: Preliminary Economic Analysis of Activated Carbon Injection", Environmental Science and Technology, 41(4), (2007), 7 pgs.

Kawabuchi, Yuji, et al., "Chemical vapor deposition of heterocyclic compounds over active carbon fiber to control its porosity and surface function", Langmuir 13.8, (1997), 2314-2317.

Keating, Martha H., et al., "Mercury Study Report to Congress vol. 1: Executive Summary", US EPA Office of Air Quality Planning and Standards, (Dec. 1997), 95 pgs.

Kilgroe, James D., et al., "Control of Mercury Emissions from Coal-Fired Electric Utility Boilers: Interim Report", US EPA Office of Research and Development, National Risk Management Laboratory, Air Pollution Prevention and Control Division, (Dec. 2001), 485 pgs.

Kyotani, T., et al., "Formation of highly orientated graphite from polyacrylonitrile by using a two-dimensional space between montmorillonite lamellae", Nature, 331, (1988), 331-333.

Lancia, A., et al., "Adsorption of Mercuric Chloride Vapours from Incinerator Flue Gases on Calcium Hydroxide Particles", Combust. Sci. & Tech., 93, (1993), 277-289.

Laumb, Jason D., et al., "X-ray photoelectron spectroscopy analysis of mercury sorbent surface chemistry", Fuel Processing Technology, 85, (2004), 577-585.

Li, Y., et al., "Removal of elemental mercury from simulated coal-combustion flue gas using a SiO2-TiO2 nanocomposite", Fuel Processing Technology, 89, (2008), 567-573.

M, Hocquel, "Quecksilber and seine Verbindungen bei der Abfallverbrennung", University of Stuttgart, (w/ English Abstract on p. 4), (Dec. 31, 2000), 113 pgs.

Maroto-Valer, M. Mercedes, et al., "Development of Activated Carbons from Coal and Biomass Combustion and Gasification Chars", Prepr. Pap.-Am. Chem. Soc., Div. Fuel Chem., 49(2), (2004), 2 pgs.

Mochida, I., et al., "Preparation of nitrogen containing pitches from quinoline and isoquinoline by AID of AICI3", Carbon, 33(8), (1995), 1069-1077.

Nelson, SIid Jr., et al., "How China Can Leapfrog the World in Mercury Emission Reductions", Proc. of the AWMA Intl. Specialty Conference on Leapfrogging Opportunities for Air Quality Improvement, (2010), 24 pgs.

Nguyen-Thanh, D., et al,, "High Porosity Carbonaceous Adsorbents Templated From Porous Clay Heterostructures", Prepr, Pap,-Am, Chem. Soc., Div. Fuel Chem., 51(1), (2006), 7-8.

(56) References Cited

OTHER PUBLICATIONS

Nguyen-Thanh, D,, et al,, "Metal-loaded carbonaceous adsorbents templated from porous clay heterostructures", Microporous and Mesoporous Materials, 92, (2006), 47-55.
Nickels, Dale L, et al., "Processing and reuse of activated carbon used to adsorb mercury from power plant flue gases", Pittsburgh Mineral and Environmental Technology, Inc., Final report, (2004), 36 pgs.
Olson, David, et al., "The reduction of gas phase air toxics from combustion and incineration sources using the MET-Mitsui-BF activated coke process", Fuel Processing Technology, (2000), 13 pgs.
Olson, David G., et al., "The Reduction of Gas Phase Air Toxics from Combustion and Incineration Sources using the MET-Mitsui-BF Activated Coke Process", Fuel Processing Technology, 65-66, (2000), 393-405.
Olson, E. S,, et al., "Catalytic effects of carbon sorbents for mercury capture", Journal of Hazardous Materials, 74, (2000), 61-79.
Olson, Edwin S., et al., "Surface Compositions of Carbon Sorbents Exposed to Simulated Low-Rank Coal Flue Gases", J. Air & Water Waste Manage. Assoc., 55, (2005), 747-754.
Padak, Bihter, "Understanding mercury binding on activated carbon", Carbon 47.1 2, (2009), 2855-2864.
Pavlish, John H., et al., "Status review of mercury control options for coal-fired power plants", Fuel Processing Technology, vol. 82, (2003), 77 pgs.
Pietrzak, et al., "Preparation of nitrogen-enriched activated carbons from brown coal", Energy and Fuels 20.3, (2006), 1275-1280.
Przepiorski, J, et al., "High temperature ammonia treatment of activated carbon for enhancement of CO2 adsorption", Applied Surface Science 225.1, (2004), 235-242.
Rachel, Ribeirovieira Azzi Rios, et al., "Tailoring Activated Carbon by Surface Chemical Modification with O, S, and N Containing Molecules", Materials Research. 6 (2), (2003), 129-135.
Raymundo-Pinero, E, et al,, "Structural characterization of N-containing activated carbon fibers prepared from a low softening point petroleum pitch and a melamine resin", Carbon 40.4, (2002), 597-608.
Robl, Tom, et al., "Coal Combustion Products (CCPs): Characteristics, Utilization and Beneficiation", Woodhead Publishing (Elsevier), (2017), 565 pgs.
Smokey, et al., "Alternative to Activated Carbon for Mercury Control", Power Engineering, (Oct. 2012), 10 pgs.
Streng, Sabine, et al,, "Toxics control by activated charcoal within the "System Dusseldorf" full scale experience", Fuel Processing Technology 39, (1994), 14 pgs.
Tsuji, K, et al., "The Activated Coke Process for Cornbinded SOx/NOx/Air Toxics Reduction", Air and Water Management Assoc., (Mar. 10, 1993), 27 pgs.
Vosteen, B, et al., "Chlor-und Bromgestutzte Hg-Sorption an Elektrofilter-Flugaschen eines kohlegefeuerten Schmelzkammerkessels und an Zementrohrnehl", Contribution to VDI Seminar 431802, "Mercury—Emissions, Measurement and Abatement Techniques", Dusseldorf, DE, (2003), 32 pgs.
Vosteen, B. W., "Bromine-enhanced Mercury Abatement from Combustion Flue Gases—Recent Industrial Applications and Laboratory Research", VGB PowerTech, vol. 86, Issue Mar. 2006, (2006), 70-75.
Vosteen, B. W., et al., "Mercury—Emissions, Measuring and Mitigation Techniques", Flyer on Mercury Abatement given at the VDI-Wissensforum, Dusseldorf, Germany, German language with machine translation, (Sep. 2003), 11 pgs.
Vosteen, B.W., et al., "Emissionsminderung von Quecksilber durch chlor—und bromgestutzte Hg-Oxidation in Rauchgas", Contribution to VDI Seminar 431802, "Mercury—Emissions, Measurement and Mitigation Techniques", Dusseldorf, DE, (Sep. 2003), 25 pgs.
Wan, Q., et al., "Removal of gaseous elemental mercury over a CeO2-WO3/TiO2 nanocomposite in simulated coal-fired flue gas", Chemical Engineering Journal, 170, (2011), 512-517.

Wang, B., et al., "Performance of a diatomite-based sorbent in removing mercury from aqueous and oil matrices", J. Environ. Eng. Sci., 6, (2007), 469-476.
Yang, Yang, et al., "Effect of HBr formation on mercury oxidation via CaBr(2) addition to coal during combustion", RSC Advances, 6(64), (2016), 7 pgs.
Zhang, Y., et al., "High efficient removal of mercury from aqueous solution by polyaniline/humic acid nanocomposite", Journal of Hazardous Materials, 175, (2010), 404-409.
Zhao, Yongxin, et al., "Effects of Sulfur Dioxide and Nitric Oxide on Mercury Oxidation and Reduction under Homogeneous Conditions", J. Air & Waste Manage. Assoc., 56, (2006), 628-635.
Zheng, Yuanjing, et al., "Review of technologies for mercury removal from flue gas from cement production processes", Progress in Energy and Combustion Science, vol. 38, No. 5, (Apr. 26, 2012), 599-629.
Zhu, Jianzhong, et al., "Enhanced mercury ion adsorption by amine-modified activated carbon", Journal of Hazardous Materials 166, (2009), 866-872.
"U.S. Appl. No. 14/712,558, Response filed Sep. 17, 2019 to Non Final Office Action dated Sep. 12 2019", 12 pgs.
"U.S. Appl. No. 15/295,594, Final Office Action dated Aug. 2, 2019", 18 pgs.
"U.S. Appl. No. 15/382,114, Response filed Oct. 3, 2019 to Final Office Action dated Jun. 21, 2019", 23 pgs.
"U.S. Appl. No. 15/452,527, Final Office Action dated Oct. 7, 2019", 4 pgs.
"U.S. Appl. No. 15/452,527, Response filed Dec. 4, 2019 to Final Office Action dated Oct. 7, 2019", 12 pgs.
"U.S. Appl. No. 15/452,527, Response filed Aug. 13, 2019 to Non-Final Office Action dated Jun. 3, 2019", 11 pgs.
"U.S. Appl. No. 15/974,343, Corrected Notice of Allowability dated Oct. 23, 2019", 2 pgs.
"U.S. Appl. No. 15/974,343, Non Final Office Action dated Aug. 21, 2019", 13 pgs.
"U.S. Appl. No. 15/974,343, Non Final Office Action dated Dec. 2, 2019", 12 pgs.
"U.S. Appl. No. 15/974,343, Response filed Jul. 10, 2019 to Final Office Action dated Jan. 14, 2019", 81 pgs.
"U.S. Appl. No. 15/997,091, Corrected Notice of Allowability dated Oct. 23, 2019", 3 pgs.
"U.S. Appl. No. 15/997,091, Corrected Notice of Allowability dated Nov. 22, 2019", 3 pgs.
"U.S. Appl. No. 15/997,091, Non Final Office Action dated Aug. 23, 2019", 14 pgs.
"U.S. Appl. No. 15/997,091, Notice of Allowance dated Sep. 18, 2019", 8 pgs.
"U.S. Appl. No. 16/509,071, Response filed Oct. 3, 2019 to Non Final Office Action dated Sep. 11, 2019", 26 pgs.
"U.S. Appl. No. 16/509,102, Amendment and Response filed Nov. 11, 2019 to Non Final Office Action dated Oct. 23, 2019", 34 pgs.
"U.S. Appl. No. 16/509,102, Non Final Office Action dated Oct. 23, 2019", 26 pgs.
"U.S. Appl. No. 16/509,146, Amendment and Response filed Nov. 11, 2019 to Non Final Office Action dated Oct. 17, 2019", 34 pgs.
"U.S. Appl. No. 16/509,146, Non Final Office Action dated Oct. 17, 2019", 24 pgs.
"Canadian Application Serial No. 2,904,039, Office Action dated Oct. 9, 2019", 5 pgs.
"Canadian Application Serial No. 2,904,039, Response Filed Aug. 16, 2019 to Office Action dated Feb. 18, 2019", 55 pgs.
"Ch. 35: Mercury, Hazardous Air Pollutants and other Multi-Pollutant Control", Tomei, G. L. (Ed.). Steam: its generation and use, Babcock and Wilcox Co., (2015), 24 pgs.
"Defendant's Answer and Counterclaim", *Midwest Energy Emissions Corp., et al.*, v. *Vistra Energy Corp., et al.* —Case 1:19-cv-01334-RGA, (Oct. 9, 2019), 71 pgs.
"European Application Serial No. 14711106.6, Communication Pursuant to Article 94(3) EPC dated Jun.7, 2019", 7 pgs.
"European Application U.S. Appl. No. 19168649.2, Extended European Search Report dated Jul. 12, 2019", 7 pgs.

(56) References Cited

OTHER PUBLICATIONS

"Original Complaint for Patent Infringement", *Midwest Energy Emissions Corp., et al.*, v. *Vistra Energy Corp., et al.* —Case 1:19-cv-01334-UNA, (Jul. 17, 2019), 31 pgs.
"Plaintiff's Answer to Defendant's Counterclaims", *Midwest Energy Emissions Corp., et al.*, v. *Vistra Energy Corp., et al.* —Case 1:19-cv-01334-RGA, (Oct. 30, 2019), 37 pgs.
Olson, E.S., et al., "Chemical mechanisms in mercury emission control technologies", J. Phys. IV France 107, Proc. of the XIIth Intl. Conference on Heavy Metals in the Environment vol. II, pp. 979-982, (2003), 6 pgs.
Olson, Edwin S., "Abstract—Multiple Site Model for Flue Gas—Mercury interactions on Activated Carbons: The Basic Site", Abstracts of Papers Part 1, 225th ACS National Meeting, New Orleans, LA, (2003), 3 pgs.
Olson, Edwin S., et al., "An Improved Model for Flue Gas—Mercury Interactions on Activated Carbons", Proceedings of the Combined Power Plant Air Pollutant Control Mega Symposium, (May 2003), 8 pgs.
Olson, Edwin, et al., "The Multiple Site Model for Flue Gas—Mercury Interactions on Activated Carbons: The Basic Site", Fuel Chemistry Preprints, 48(1), (2003), 3 pgs.
"U.S. Appl. No. 15/951,970, Notice of Allowance dated Jan. 12, 2021", 10 pgs.
"U.S. Appl. No. 15/951,970, Response filed Nov. 25, 2020 to Non Final Office Action dated May 27, 2020", 19 pgs.
"U.S. Appl. No. 16/509,071, Examiner Interview Summary dated Dec. 21, 2020", 3 pgs.
"U.S. Appl. No. 16/509,071, Final Office Action dated Dec. 8, 2020", 10 pgs.
"U.S. Appl. No. 16/509,071, Notice of Allowance dated Jan. 6, 2021", 8 pgs
"U.S. Appl. No. 16/509,071, Response filed Nov. 25, 2020 to Non Final Office Action dated May 29, 2020", 29 pgs.
"U.S. Appl. No. 16/509,071, Response filed Dec. 17, 2020 to Final Office Action dated Dec. 8, 2020", 12 pgs.
"Chinese Application Serial No. 201710951091.0, Response filed Nov. 4, 2020 to Office Action dated Aug. 20, 2020", w/ English Claims, 22 pgs.
"Activated carbon", Wikipedia, [Online] Retrieved from the Internet: <URL: https://en.wikipedia.org/wiki/Activated_carbon>, (Retrieved on May 11, 2020), 21 pgs.
"U.S. Appl. No. 14/712,558, Notice of Allowance dated Dec. 13, 2019", 7 pgs.
"U.S. Appl. No. 15/382,114, Non Final Office Action dated Dec. 31, 2019", 33 pgs.
"U.S. Appl. No. 15/382,114, Notice of Allowance dated Aug. 10, 2020", 11 pgs.
"U.S. Appl. No. 15/382,114, Response filed Jun. 30, 2020 to Non Final Office Action dated Dec. 31, 2019", 21 pgs.
"U.S. Appl. No. 15/452,527, Non Final Office Action dated Mar. 9, 2020", 6 pgs.
"U.S. Appl. No. 15/951,970, Non Final Office Action dated May 27, 2020", 26 pgs.
"U.S. Appl. No. 15/974,343, Notice of Allowance dated Apr. 13, 2020", 7 pgs.
"U.S. Appl. No. 15/974,343, Response filed Apr. 2, 2020 to Non-Final Office action filed Dec. 2, 2019", 13 pgs.
"U.S. Appl. No. 16/130,670, Final Office Action dated Aug. 24, 2020", 11 pgs.
"U.S. Appl. No. 16/130,670, Non Final Office Action dated Dec. 16, 2019", 8 pgs.
"U.S. Appl. No. 16/130,670, Response filed Jun. 16, 2020 to Non Final Office Action dated Dec. 16, 2019", 14 pgs.
"U.S. Appl. No. 16/509,071, Final Office Action dated Dec. 12, 2019", 23 pgs.
"U.S. Appl. No. 16/509,071, Non Final Office Action dated May 29, 2020", 31 pgs.
"U.S. Appl. No. 16/509,071, Response filed May 12, 2020 to Final Office Action dated Dec. 12, 2019", 31 pgs.
"U.S. Appl. No. 16/509,102, Final Office Action dated Feb. 14, 2020", 13 pgs.
"U.S. Appl. No. 16/509,146, Final Office Action dated Feb. 14, 2020", 23 pgs.
"Chinese Application Serial No. 201710951091.0, Office Action dated Aug. 20, 2020", w/ English Translation, 39 pgs.
"Chinese Application Serial No. 201710951091.0, Office Action dated Nov. 5, 2019", w/ English Translation. 41 pgs.
"Chinese Application Serial No. 201710951091.0, Response filed May 8, 2020 to Office Action dated Nov. 5, 2019", w/ English Claims, 24 pgs.
"DARCO Hg, Powdered Activated Carbon Data SHeet", CABOT Corp., (Oct. 24, 2017), 2 pgs.
"European Application Serial No. 14711106.6, Communication Pursuant to Article 94(3) EPC dated Feb. 19, 2020", 5 pgs.
"European Application Serial No. 14711106.6, Response filed Dec. 12, 2019 to Communication Pursuant to Article 94(3) EPC dated Jun. 7, 19, 2019", 16 pgs.
"European Application Serial No. 19202202.8, Extended European Search Report dated Jan. 8, 2020", 7 pgs.
"Fluegas Properties Calculator", Increase Performance Inc., [Online] Retrieved from the Internet: <URL: http://www.increase-performance.com/calc-flue-gas-prop.html>, (Retrieved on May 11, 2020). 1 pg.
"STEAM Table 8a, 8b", Steam: its Generation and Use 42nd Ed, (2015), 2 pgs.
Ni, Yonghong, "Radiation Technology and Material Synthesis", (Jul. 31, 2011), 111-112.
"U.S. Appl. No. 15/951,970, Corrected Notice of Allowability dated Jan. 28, 2021", 4 pgs.
"U.S. Appl. No. 16/130,670, Response filed Feb. 22, 2021 to Final Office Action dated Aug. 24, 2020"14 pgs.
"U.S. Appl. No. 16/509,071, Corrected Notice of Allowability dated Jan. 27, 2021", 4 pgs.
"U.S. Appl. No. 16/993,361, Preliminary Amendment filed Feb. 16, 2021", 6 pgs.
"U.S. Appl. No. 17/125,641, Non Final Office Action dated Mar. 1, 2021", 12 pgs.
"Chinese Application Serial No. 201710951091.0, Decision of Rejection dated Feb. 9, 2021", 31 pgs.
U.S. Appl. No. 17/125,641, filed Dec. 17, 2020, Sorbents for the Oxidation and Removal of Mercury.
U.S. Appl. No. 17/015,392, filed Sep. 9, 2020, Carbon Nanocomposity Sorbent and Methods of Using the Same for Separation of One or More Materials from a Gas Stream.
U.S. Appl. No. 16/993,361, filed Aug. 14, 2020, Sorbents for the Oxidation and Removal of Mercury.

* cited by examiner

ACTIVATED CARBON SORBENT INCLUDING NITROGEN AND METHODS OF USING THE SAME

CROSS-REFERENCE TO RELATED APPLICATION

This application is a continuation of U.S. patent application Ser. No. 15/589,359, filed May 8, 2017, which is a continuation of U.S. patent application Ser. No. 14/195,360, filed Mar. 3, 2014, now issued as U.S. Pat. No. 9,669,355, which claims the benefit of priority to U.S. Provisional Patent Application Ser. No. 61/773,549, filed Mar. 6, 2013, the disclosures of which are incorporated herein in their entireties by reference.

BACKGROUND OF THE INVENTION

Mercury (Hg) emissions have become a health and environmental concern because of their toxicity and ability to bioaccumulate. The U.S. Environmental Protection Agency (EPA) has issued regulations for the control of mercury emissions from waste-to-energy, cement production, and coal-fired power plants. Mercury in flue gas from industrial sources (e.g., power plants) can be captured by sorbents such as activated carbon, which can then be removed by particulate separation devices. The amount of standard sorbents (e.g., activated carbon) needed to serve the market is large. Standard sorbents are not always effective and become more expensive as larger amounts are used.

Inhibition of mercury capture from gas streams by active carbon sorbents can occur when sulfur(VI) (e.g. $SO_3$, $H_2SO_4$) is present in the gas stream, with increasing inhibition at higher concentrations. Mercury capture above sulfur(VI) concentrations of 3 ppm by mole is limited. Many utilities desire to operate $SO_3$ injection systems at a minimum of about 5-6 ppm to improve ash collectability. However, a sulfur(VI) concentration of about 6 ppm can diminish elemental mercury capture by about 25%-50% or more. With this reduction, it becomes difficult, if not impossible, to economically achieve desired mercury levels. The scientific understanding of why a severe inhibition of mercury sorption exists when sulfur(VI) concentrations increase by such a small amount is limited.

SUMMARY OF THE INVENTION

In various embodiments, the present invention provides an activated carbon sorbent. The activated sorbent includes a halogen- or halide-promoted carbon. The activated carbon includes activated carbon sorbent particles including nitrogen. The concentration of nitrogen in a surface layer of the sorbent particles is at least one of 1) higher than the concentration of nitrogen in a core of the sorbent particles and 2) higher than the concentration of nitrogen in the carbon material from which the sorbent particles are derived.

In various embodiments, the present invention provides a method of making an activated carbon sorbent. The method includes contacting a carbonaceous material and a nitrogenous material, to provide an unpromoted carbon sorbent comprising nitrogen. The method also includes promoting at least a portion of the unpromoted sorbent by contacting the portion of the unpromoted sorbent with a promoter to form an activated carbon sorbent comprising activated carbon sorbent particles comprising nitrogen, wherein the concentration of nitrogen in the sorbent particles is higher than the concentration of nitrogen in the carbonaceous material.

In various embodiments, the present invention provides an activated carbon sorbent for use in mercury removal from a mercury-containing gas. The activated carbon sorbent includes a halogen- or halide-promoted inorganic activated carbon particles including nitrogen in a surface layer of the sorbent particles. The nitrogen atoms are at sufficient concentration in the surface layer of the activated carbon sorbent particles to at least one of a) decrease neutralization by $HSO_3^{1-}$ or $SO_3^{2-}$ of carbocations in the activated carbon sorbent, as compared to a corresponding activated carbon sorbent comprising less or substantially no nitrogen in a corresponding particle surface layer under substantially similar conditions, and b) at least partially block carbocations in the activated carbon from forming ionic bonds with $HSO_3^{1-}$ or $SO_3^{2-}$, as compared to a corresponding activated carbon sorbent including less or substantially no nitrogen in a corresponding particle surface layer under substantially similar conditions.

In various embodiments, the present invention provides a method of reducing the pollutant content in a pollutant-containing gas. The method includes obtaining or providing an activated carbon sorbent including activated carbon sorbent particles including nitrogen in a surface layer of the sorbent particles. The method includes contacting a pollutant-containing gas with the activated carbon sorbent. The contacting forms a pollutant-sorbent composition. The method also includes separating at least some of the pollutant-sorbent composition from the pollutant-containing gas. The separating gives a separated gas.

In various embodiments, the present invention provides a method for reducing the mercury content of a mercury-containing gas. The method includes obtaining or providing a carbon precursor. The carbon precursor includes nitrogen. The method includes obtaining or providing a substrate material. The method includes contacting the carbon precursor and the substrate material. The contacting provides an inorganic matrix-supported sorbent starting material. The method includes heating the inorganic matrix-supported sorbent starting material. The heating provides an unpromoted sorbent. The method includes promoting at least a portion of the unpromoted sorbent by contacting (e.g., chemically reacting) the portion of the unpromoted sorbent with a promoter to form a promoted inorganic matrix-supported activated carbon sorbent. The activated carbon sorbent includes activated carbon sorbent particles including nitrogen in a surface layer of the sorbent particles. The method includes contacting the mercury-containing gas with the activated carbon sorbent. The contacting forms a mercury-sorbent composition. The method also includes separating at least some of the mercury-sorbent composition from the mercury-containing gas. The separating gives a separated gas. The concentration of sulfur(VI) in the mercury-containing gas is about 3-1000 ppm by mole. A first quantity of the activated carbon sorbent forms a mercury-sorbent composition at a first mercury adsorption rate. The first adsorption rate is higher than a mercury absorption rate of the first quantity of a corresponding activated carbon sorbent including at least one of a) less or substantially no nitrogen in a corresponding particle surface layer, b) less or substantially no halide- or halogen-promotion, and c) less or substantially no inorganic matrix support.

In various embodiments, the present invention provides a method of making an activated carbon sorbent. The method includes obtaining or providing an unpromoted carbon sorbent including nitrogen. The method includes promoting at least a portion of the unpromoted sorbent by contacting (e.g., chemically reacting) the portion of the unpromoted sorbent with a promoter to form an activated carbon sorbent including activated carbon sorbent particles including nitrogen in a surface layer of the sorbent particles.

Various embodiments of the present invention provide certain advantages over other activated carbon sorbents and methods of using the same, at least some of which are unexpected. In some embodiments, the activated carbon sorbent can separate a material (e.g., a pollutant) from a gas that includes that material more efficiently than other methods. In various embodiments, mercury removal efficiencies of the activated carbon exceed or match that of conventional methods with added benefits such as reduced costs. The method and materials of various embodiments of the present invention can operate more efficiently than other methods of mercury removal. In some embodiments, the method and materials of various embodiments can remove a given amount of mercury for a smaller amount of financial expenditure, as compared to other methods. For example, the method and materials of various embodiments can remove a larger amount of mercury for a given mass of carbon, as compared to other methods of removing mercury, including as compared to other methods of removing mercury that include a carbon sorbent.

For example, in some embodiments, a given mass of the nitrogen-containing activated carbon sorbent can absorb mercury from a mercury-containing gas stream including sulfur(VI) (e.g., $SO_3$, $H_2SO_4$, or the like), such as greater than about 3 ppm sulfur(VI), such as about 3-200 ppm sulfur (VI), 3-1000 ppm sulfur(VI), or about 3-10 ppm sulfur(VI), at a higher rate than the same mass of a corresponding activated carbon sorbent including less or no nitrogen, such as a lower concentration of nitrogen or no nitrogen in a corresponding particle surface layer. In some embodiments, carbocations in the activated carbon sorbent are neutralized less by ions derived from $SO_3$, such as $SO_3^{2-}$ or $HSO_3^{1-}$, than other activated carbon sorbents, such as other activated carbon sorbents including less or substantially no nitrogen in a corresponding particle surface layer. In some embodiments, carbocations in the activated carbon sorbent are at least partially blocked from ions derived from $SO_3$, such as $SO_3^{2-}$ or $HSO_3^{1-}$, more than in other activated carbon sorbents, such as in other activated carbon sorbents including less or substantially no nitrogen in a corresponding particle surface layer.

In some embodiments, the sorbent can be regenerated and reused, reducing disposal of spent sorbents and decreasing the cost of mercury removal. In some embodiments, preparation or promotion of the activated carbon sorbent can advantageously occur on site. On site preparation and promotion can have advantages including, for example: reduction or elimination of equipment costs and operating costs of a separate preparation facility or location, reduction or elimination of transportation costs, fresher and more reactive sorbent, reduction of handling, on-site tailoring of composition (such as when changing fuels or reducing loads).

In some embodiments, counter to traditional teachings that inorganic components can hinder sorption of pollutants on activated carbon, an inorganic matrix support in the sorbent can enhance the sorption of pollutant in the activated carbon, such as on a proximate and oxidatively reactive carbon graphene layer. In various embodiments, an inorganic matrix support can stabilize the development of cationic sites on the proximate graphene carbon structures which can oxidize pollutants such as mercury. In embodiments that include an inorganic matrix-supported nanocomposite that is promoted via a hydrogen halide compound obtained from degradation or reaction of the corresponding ammonium halide, another advantageous role for the inorganic portion can be in providing a binding site for the ammonia that is released from either the decomposition or reaction of the ammonium salt. The bound ammonia can form a complex with basic character that can react with $SO_2$ or $SO_3$ in the pollutant-containing gas and can prevent their interference with the sorption of pollutants such as mercury in or near active sites on the activated carbon.

Clays are usually difficult to filter or separate from an aqueous medium. In some embodiments that include clay as an inorganic matrix support, the clay is advantageously stabilized to dispersion in an aqueous medium, and can be easily separated from an aqueous medium by filtration.

DETAILED DESCRIPTION OF THE INVENTION

Reference will now be made in detail to certain embodiments of the disclosed subject matter. While the disclosed subject matter will be described in conjunction with the enumerated claims, it will be understood that the exemplified subject matter is not intended to limit the claims to the disclosed subject matter.

Values expressed in a range format should be interpreted in a flexible manner to include not only the numerical values explicitly recited as the limits of the range, but also to include all the individual numerical values or sub-ranges encompassed within that range as if each numerical value and sub-range is explicitly recited. For example, a range of "about 0.1% to about 5%" or "about 0.1% to 5%" should be interpreted to include not just about 0.1% to about 5%, but also the individual values (e.g., 1%, 2%, 3%, and 4%) and the sub-ranges (e.g., 0.1% to 0.5%, 1.1% to 2.2%, 3.3% to 4.4%) within the indicated range. The statement "about X to Y" has the same meaning as "about X to about Y," unless indicated otherwise. Likewise, the statement "about X, Y, or about Z" has the same meaning as "about X, about Y, or about Z," unless indicated otherwise.

In this document, the terms "a," "an," or "the" are used to include one or more than one unless the context clearly dictates otherwise. The term "or" is used to refer to a nonexclusive "or" unless otherwise indicated. In addition, it is to be understood that the phraseology or terminology employed herein, and not otherwise defined, is for the purpose of description only and not of limitation. Any use of section headings is intended to aid reading of the document and is not to be interpreted as limiting; information that is relevant to a section heading may occur within or outside of that particular section. Furthermore, all publications, patents, and patent documents referred to in this document are incorporated by reference herein in their entirety, as though individually incorporated by reference. In the event of inconsistent usages between this document and those documents so incorporated by reference, the usage in the incorporated reference should be considered supplementary to that of this document; for irreconcilable inconsistencies, the usage in this document controls.

In the methods of manufacturing described herein, the steps can be carried out in any order without departing from the principles of the invention, except when a temporal or operational sequence is explicitly recited. Furthermore, specified steps can be carried out concurrently unless explicit claim language recites that they be carried out separately. For example, a claimed step of doing X and a claimed step of doing Y can be conducted simultaneously within a single operation, and the resulting process will fall within the literal scope of the claimed process.

Definitions

The term "about" as used herein can allow for a degree of variability in a value or range, for example, within 10%, within 5%, or within 1% of a stated value or of a stated limit of a range.

The term "substantially" as used herein refers to a majority of, or mostly, as in at least about 50%, 60%, 70%, 80%, 90%, 95%, 96%, 97%, 98%, 99%, 99.5%, 99.9%, 99.99%, or at least about 99.999% or more.

The term "number-average molecular weight" as used herein refers to the ordinary arithmetic mean of the molecular weight of individual molecules in a sample. It is defined as the total weight of all molecules in a sample divided by the total number of molecules in the sample. Experimentally, the number average molecular weight ($M_n$) is determined by analyzing a sample divided into molecular weight fractions of species i having $n_i$ molecules of molecular weight $M_i$ through the formula $M_n = \Sigma M_i n_i / \Sigma n_i$. The number average molecular weight can be measured by a variety of well-known methods including gel permeation chromatography, spectroscopic end group analysis and osmometry.

The term "weight-average molecular weight" as used herein refers ($M_w$), which is equal to $\Sigma M_i^2 n_i / \Sigma M_i n_i$, where $n_i$ is the number of molecules of molecular weight $M_i$. In various examples, the weight average molecular weight can be determined using light scattering, small angle neutron scattering, X-ray scattering, and sedimentation velocity.

The term "solvent" as used herein refers to a liquid that can dissolve a solid, liquid, or gas. Nonlimiting examples of solvents are silicones, organic compounds, water, alcohols, ionic liquids, and supercritical fluids.

The term "air" as used herein refers to a mixture of gases with a composition approximately identical to the native composition of gases taken from the atmosphere, generally at ground level. In some examples, air is taken from the ambient surroundings. Air has a composition that includes approximately 78% nitrogen, 21% oxygen, 1% argon, and 0.04% carbon dioxide, as well as small amounts of other gases.

The term "room temperature" as used herein refers to a temperature of about 15° C. to 28° C.

As used herein, "mineral" refers to a naturally occurring solid chemical substance formed through biogeochemical processes, having, for example, characteristic chemical composition, highly ordered atomic structure, and specific physical properties.

Description

In various embodiments, the present invention provides an activated carbon sorbent and associated method for reduction of mercury content for use in combustion systems that have inherently high levels of sulfur(VI) (e.g. as $SO_3$, or related compounds that can be derived therefrom such as $H_2SO_4$ or other sulfates) in the flue gas and for use in plants that use $SO_3$ injection for ash conditioning for improved ash collection. The method can obtain high mercury capture rates in a high sulfur(VI)-content flue gas by, in some examples, overcoming the kinetic and equilibrium effects that can inhibit mercury capture in high $SO_3$ or high-sulfate (e.g. high sulfur(VI)) systems. The activated carbon sorbent includes activated carbon sorbent particles. The concentration of nitrogen in a surface layer of the sorbent particles can be higher than the concentration of nitrogen in a core of the sorbent particles. In some examples, the activated carbon sorbent can be promoted.

In various embodiments, the activated carbon sorbent and associated method can be effective for removal of elemental mercury vapor in an air or flue gas stream at moderate temperatures (e.g., about 25-330° C., or about 50-500° C.). In some examples, the activated carbon is not impregnated with sulfur or metal halides, which can be unstable at higher temperatures.

In some embodiments, the removal process does not involve adsorption of the elemental mercury like that occurring at low temperatures, but can involve the catalyzed reaction of mercury with an oxidant to form an organomercury compound that includes the mercury bound to the activated carbon surface, wherein the mercury can be released via, e.g., reaction with acid, to provide a mercury (II) species with low vapor pressures such as mercury sulfate, mercury bromide, or mercury chloride. The ionic mercury(II) form can be an oxide or salt of an optional acid used in the process (such as sulfate from sulfuric acid), which can have lower volatility. The activated carbon can exhibit a high rate of oxidative catalytic activity due to, for example, numerous active catalytic sites and, at the same time, possess a large surface area for generation of the organomercury compound and thus rapidly generate the converted mercury(II) salt.

Activated Carbon Sorbent Including Nitrogen.

In various embodiments, the present invention provides an activated carbon sorbent. The activated carbon sorbent can include halogen- or halide-promoted activated carbon particles; in other embodiments, the activated carbon sorbent is not promoted. In some examples, the activated carbon can have an inorganic matrix-support.

The activated carbon sorbent can include activated carbon sorbent particles. The concentration of nitrogen in a surface layer of the sorbent particles can be at least one of 1) higher than the concentration of nitrogen in a core of the sorbent particles and 2) higher than the concentration of nitrogen in the activated carbon material from which the activated carbon sorbent particle was derived. The surface layer of each particle can independently be continuous (e.g., unbroken, with minimal or no gaps) or non-continuous. The surface layer can be at the outer surface of the particle. The surface layer of each particle can independently have any suitable thickness. The surface layer can have a variable thickness, or can have a substantially consistent thickness. In some embodiments, the surface layer can have a thickness of about 0.000,001% to about 99.99% of the radius of the particle, 0.001% to 99%, 0.001% to about 50%, 1% to about 50%, 0.1% to 25%, or about 25% to 50% of the radius of the particle. If the particle is non-spherical the radius can be estimated as about one-half of the largest dimension of the particle.

In some embodiments, each activated carbon particle can independently include about 1.001 times higher nitrogen concentration in the surface layer than in the core or less, or about 1.01, 1.1, 1.2, 1.4, 1.6, 1.8, 2, 3, 4, 5, 6, 7, 8, 9, 10, 15, 20, 50, 100, or about 1000 times higher nitrogen concentration in the surface layer than in the core. In some embodiments, the concentration of nitrogen in the surface layer can be about 0.000,001 wt % or less, or about 0.001 wt %, 0.01 wt %, 0.1 wt %, 1 wt %, 2 wt %, 3 wt %, 4 wt %, 5 wt %, 10 wt %, 15 wt %, 20 wt %, 30 wt %, 40 wt %, 50 wt %, 60 wt %, 70 wt %, 80 wt %, or about 90 wt % or more nitrogen. In some examples, the concentration of nitrogen in the surface layer can be about 0.001 wt %-99 wt % nitrogen, 5 wt %-80 wt %, or about 5-60 wt %. In various embodiments, the concentration of nitrogen in the core can be about 0 wt %, 0.000,001 wt %, or about 0.001 wt %, 0.01 wt %, 0.1 wt %, 1 wt %, 2 wt %, 3 wt %, 4 wt %, 5 wt %, 10 wt %, 15 wt %, 20 wt %, 50 wt %, or 90 wt % or more. In some examples, the concentration of nitrogen in the core can be about 0.001 wt %-99 wt % nitrogen, 0.1 wt %-20 wt % or about 1 wt %-6 wt %.

The activated carbon sorbent can be in any suitable form. For example, the activated carbon can be granular, or fine particles. The activated carbon can have any suitable shape, such as spherical or irregular. The activated carbon can have an average diameter of about 0.1 nm or less, or about 1 nm, 10 nm, 100 nm, 1 μm, 10 μm, 100 μm, 1 mm, or about 10 mm or more. In some examples, the activated carbon has a diameter of about 0.01 μm or less, or about 0.1 μm, 1 μm, 2 μm, 3 μm, 4 μm, 5 μm, 10 μm, 20 μm, 30 μm, 40 μm, 50 μm, 60 μm, 70 μm, 80 μm, 90 μm, 100 μm, 1000 μm or more. In some examples, the diameter of the particle is about 0.1-1000 μm, or 1-100 μm, or about 1-30 μm. If a particle is non-spherical, the diameter can be estimated as the longest dimension of the particle. The absorption capacity of the activated carbon sorbent including mercury can be about 0.000,1 mg mercury per gram of sorbent or less, or about 0.001 mg/g, 0.01, 0.1, 1, 2, 3, 4, 5, 10, 15, 20, 25, 30, 35, 40, 45, 50, 55, 60, 65, 70, 75, 80, 85, 90, 95, 100, 110, 120, 150, 200, 300, 400, 500, 750, or about 1 g mercury per gram of sorbent or more.

In some embodiments, at least some of the carbon in the activated carbon is in the graphene form of carbon. The graphene form of carbon can, in some embodiments, include higher concentrations of locations suitable as active sites. In some examples, certain parts of graphene carbon can have the highest concentrations of locations suitable as active sites: in some examples at the edges, in some examples in non-edge locations. Such locations suitable as active sites may be activated via treatment with halide or halogen, as described herein. In various embodiments, the carbon in the activated carbon sorbent can be at least about 1 wt %, 2 wt %, 3 wt %, 4 wt %, 5 wt %, 10 wt %, 20 wt %, 30 wt %, 40 wt %, 50 wt %, 60 wt %, 70 wt %/o, 80 wt %, 90 wt %, 95 wt %, 96 wt %, 97 wt %, 98 wt %, 99 wt %, 99.9 wt %, 99.99 wt %, or more than about 99.999 wt % graphene form of carbon.

In some embodiments, the nitrogen is substantially homogenously distributed throughout the activated carbon particles. In some embodiments, the nitrogen is substantially homogenously distributed in the core of the activated carbon sorbent particles; in other embodiments, the nitrogen can have any suitable distribution in the core. In some embodiments, the nitrogen is substantially homogenously distributed in the surface layer of the activated carbon sorbent particles. In some embodiments, the nitrogen in the surface layer is not homogeneously distributed; e.g., the nitrogen can have a gradient with the highest concentration at the outside of the surface layer and a lower concentration at an inside of the surface layer.

The nitrogen can be in any suitable form within the activated carbon. In some examples, the nitrogen can be a nitrogen atom bound to one or more hydrogen atoms or one or more other atoms that are, for example, carbon-containing groups that are part of the activated carbon framework (e.g. the activated carbon backbone or appendages thereof), or to an organic group. In some examples, for example, the nitrogen can be neutral or can bear a positive charge (e.g. ammonium) or a negative charge. The nitrogen can have any suitable oxidation state, for example zero or one. The nitrogen can be bound to 4, 3, 2, 1, or zero hydrogen atoms. The nitrogen can be bound to one or more activated carbon frameworks at zero, 1, 2, 3, or 4 locations. In some embodiments, the nitrogen can include one or two double bonds or one triple bond to the carbon framework of the activated carbon or to other functional groups, such that the nitrogen is bound to 1, 2, or 3 carbon atoms.

The nitrogen in the activated carbon can be derived from any nitrogen containing compound, such as a nitrogen-containing organic or inorganic compound, such as by pyrolysis or carbonization. In some examples, the nitrogen is derived from or part of any nitrogen-containing heterocycle, or from any other nitrogen-containing compound. For example, the nitrogen can be derived from indole, quinoxaline, carbazole, isoquinoline, piperazine, quinolone, quinoxaline, diazabicyclooctane, polyacrylonitrile, polyvinylpyrrolidone, vinylpyrrolidone-vinyl acetate copolymer, vinylpyrrolidone-acrylic acid copolymer, vinylpyrrolidone-maleic acid copolymer, polyethylenimine, an amino acid (e.g., alanine, arginine, asparagine, aspartic acid, cysteine, glutamine, glutamic acid, glycine, histidine, isoleucine, leucine, lysine, methionine, phenylalanine, proline, serine, threonine, tryptophan, tyrosine, or valine), analine, nitrobenzene, hydroxylamine, urea, hydrazine, sulfamic acid, nitriles, carbamates, isocyanates, urethanes, or a combination thereof. In some examples, the nitrogen in the activated carbon can be derived from or part of a nitrogen-containing inorganic compound, such as ammonia, ammonium bromide, ammonium chloride, nitric acid, nitrous acid, nitrogen dioxide, compounds including $NO_3$, compounds including $NO_2$, and the like.

In various embodiments, the nitrogen-containing activated carbon sorbent can absorb pollutants such as mercury at a higher rate in a given concentration of sulfur(VI) than other sorbents. In some examples, a first quantity of the activated carbon sorbent forms a mercury-sorbent composition at a first mercury adsorption rate in a gas composition including mercury wherein the concentration of sulfur(VI) in the gas composition is about 3-2000 ppm by mole, where the first adsorption rate is higher than a mercury absorption rate of the first quantity of a corresponding activated carbon sorbent including at least one of a) less (e.g., lower concentration) or substantially no nitrogen in a corresponding particle surface layer, b) less or substantially no halide- or halogen-promotion, and c) less or substantially no inorganic matrix support.

The mechanism of operation of the activated carbon sorbent is not intended to be limited to any particular theory of operation as advanced herein. In some embodiments, the nitrogen in the surface layer at least partially decreases neutralization by $SO_3$ (or ions or other materials derived from $SO_3$ such as $HSO_3^{1-}$ or $SO_3^{2-}$) of carbocations in the activated carbon sorbent, as compared to a corresponding activated carbon sorbent including less or substantially no nitrogen in a corresponding particle surface layer under substantially similar conditions. In some examples, the nitrogen in the surface layer at least partially blocks carbocations in the activated carbon from forming ionic bonds with $SO_3$ (or ions or other materials derived from $SO_3$ such as $HSO_3^{1-}$ or $SO_3^{2-}$), as compared to a corresponding activated carbon sorbent including less or substantially no nitrogen in a corresponding particle surface layer under substantially similar conditions.

In various active carbon sorbents, two issues can occur during pollutant capture such as mercury capture: 1) getting high oxidation reactivity at a carbon edge site (kinetic effect) and 2) preventing/avoiding the loss of oxidized mercury from the carbon-bound states as a result of displacement by sulfate (equilibrium effect). Elemental mercury in the gas phase can be oxidized at the carbon edge surface (cationic zigzag sites) and can be bound covalently as an organomercury halide. The cationic sites can be formed by addition of acids or halogens ($X_2$) to the carbon edge structure, which can result in a carbenium-halide ion pair. The oxidation can be assisted by the negative halide ion stabilizing the developing positive charge on the mercury atom as it adds to the carbenium atom. The oxidation can occur more readily if the oxidation potential (charge) of the carbenium ion or stability thereof is higher, which can be influenced or determined by the adjacent charges present in the carbon framework structure and nearby surroundings. Additional cationic functionality in the structure can raise the oxidation potential (increases positive charge) at the reactive site, or can increase the stability of a positive charge at the reactive site. Negative groups (such as ions derived from $SO_3$, e.g., $SO_3^{2-}$ and $SO_2^{1-}$, can stabilize and lower the overall charge and available carbenium ions and thereby reduce the reactivity for oxidation of the mercury and availability for capture of mercury.

The longer-term equilibrium effect can be less important for capture over a short contact time, such as inflight capture by electrostatic precipitators (ESPs). However, in some situations the equilibrium displacement problem can be more important, e.g., baghouse collection or $SO_3$ injection or formation in a selective catalytic reduction (SCR) unit. Since sulfate concentrations can increase with time of exposure on the carbon surface, their effect in displacing mercury halides into the gas phase (desorption and breakthrough) can be important in long exposure times. When $SO_3$ related compounds and ions such as sulfuric acid, sulfate, or related ions, are initially present or form quickly on a wet surface, e.g., with $SO_3$ injection, the equilibrium displacement effect can also become important in systems with a short contact time.

In various embodiments, the nitrogen in the surface layer can stabilize or increase positive charge in the carbon structure which can overcome depletion of charge by sulfate and the carbon edge can be promoted with a halogen/halide. In some embodiments, the collection of cationic centers in the carbon edge structures (normally present in a halogenated (e.g. brominated) carbon and useful for rapid mercury oxidation) can be impaired by interference of bisulfate ions and other related ions formed from $SO_3$ reaction at the carbon surface. These anions can neutralize the positive charge of the carbenium ions and lower the overall oxidation potential of the remaining reactive sites that have a shared charge. Additional cationic centers can be generated within the carbon structure by introducing nitrogen atoms during the activated carbon formation, helping to counter this effect and offset some of the charge that can used by ionic or other interactions with, e.g., $SO_3$ or ions derived from $SO_3$. Atoms such as nitrogen can be added in the polycyclic structure to form increased cations or to stabilize existing cations.

In some embodiments, the nitrogen in the surface layer of the activated carbon sorbent particles increases the cationic charge in the sorbent because the nitrogen protects the cation centers from $SO_3$ and ions or compounds derived from $SO_3$. The nitrogen atoms can form or be part of a charged cage or other protective blocking structure around a carbon edge structure to prevent access by $SO_3$ and ions or compounds derived from $SO_3$ such as anionic sulfate groups but allow diffusion of mercury atoms into the nanostructure to reach active centers for oxidation or sorbtion.

In some embodiments, an inorganic matrix support such as clay can help to block active cationic centers from access by $SO_3$ and ions or compounds derived from $SO_3$ or can help to stabilize or increase the cationic charge in the active carbon sorbent.

In some embodiments, addition of acid or acidic materials to the activated carbon improves the performance. In various embodiments, acid or acidic materials can be added prior to the use of the carbon by impregnating an acidic solution into the carbon, or can be added as a solution or gas to the sorbent bed during use. The modified carbon can be impregnated with an acidic material, such as about 1 wt % or less or about 2 wt %, 3, 4, 5, 6, 7, 8, 9, 10, 15, or about 20 wt % or more or acidic material, such as HBr, HCl, $H_2SO_4$, and the like.
Method of Reducing Pollutant Content in a Pollutant-Containing Gas.

In various embodiments, the present invention provides a method of using the activated carbon sorbent. The method can be any suitable method. For example, some embodiments provide a method of reducing the pollutant content in a pollutant-containing gas. In some examples, the pollutant-containing gas can include at least some oxygen. The method can include obtaining or providing an activated carbon sorbent including activated carbon sorbent particles including nitrogen in a surface layer or the sorbet particles. In some embodiments, the concentration of nitrogen in a surface layer of the sorbent particles can be higher than the concentration of nitrogen in a core of the sorbent particles. The activated carbon sorbent can be any activated carbon sorbent including nitrogen described herein. In some examples, the activated carbon sorbent including nitrogen can be a promoted activated carbon sorbent including nitrogen. In some examples, the activated carbon sorbent including nitrogen can be an inorganic matrix-supported or nanocomposite activated carbon sorbent including nitrogen. In some examples, the activated carbon sorbent can be both promoted and an inorganic matrix-supported or nanocomposite activated carbon sorbent including nitrogen. In some embodiments, the activated carbon sorbent can be promoted but include no inorganic matrix support. In some embodiments, the activated carbon sorbent can be neither promoted nor inorganic matrix-supported. The activated carbon sorbent can include binding sites that can bind with at least one of the pollutant in the pollutant-containing gas and an oxidized species of the pollutant, to form the pollutant-sorbent composition. At least a portion of the binding sites in the activated carbon sorbent can react with at least one of the pollutant and an oxidized species of the pollutant, to form the pollutant-sorbent composition.

The method of reducing the pollutant content in a pollutant-containing gas can include contacting a pollutant-containing gas with the activated carbon sorbent. The contacting forms a pollutant-sorbent composition. The contacting can be any suitable contacting. In some embodiments, contacting the pollutant-containing gas with the activated carbon sorbent can include adding or injecting the activated carbon sorbent into the pollutant containing gas. For example, the contacting can occur in the gas. In another embodiment, the contacting can occur in an aqueous liquid. In another example, the contacting can occur in the gas, and subsequently contacting can also occur in an aqueous phase such as a scrubber.

In some embodiments, during the contacting of the pollutant-containing gas with the activated carbon sorbent, the activated carbon sorbent can be in any suitable configuration such that it contacts the pollutant-containing gas. For example, during the contacting, the activated carbon sorbent can be at least one of in a fixed structure such as a fixed bed, in a moving structure such as a moving bed, in a scrubber, in a filter (e.g., a fixed filter or a travelling/moving filter) or suspended in the pollutant-containing gas.

The pollutant-sorbent composition can be any suitable composition including the pollutant or an oxidized or otherwise chemically transformed form of the pollutant and the activated carbon sorbent. In some embodiments, mercury is absorbed in its elemental form by the sorbent; the mercury-sorbent composition can include the sorbent and the elemental form of mercury. In some embodiments, the mercury is converted by the sorbent via a chemical reaction, such as oxidation, such that the mercury from the gas is transformed into an organomercury compound including the carbon framework of the activated carbon bound to mercury, which can be released as a mercury (II) compound upon reaction with a suitable acid to generate the salt thereof. In some embodiments, the mercury-sorbent composition can include at least one of elemental mercury, organomercury compound, and Hg(II) compounds.

In some examples, elemental mercury or transformed mercury can remain absorbed to the sorbent until the mercury-sorbent composition has been removed in a later separation step. For example, elemental mercury or transformed mercury can be absorbed, or reacted and absorbed, into or onto the sorbent composition, such that after separating the pollutant-sorbent composition from the pollutant-containing gas, the separated gas has about 1% or less, 3%, 5%, 10%, 20%, 30%, 40%, 50%, 60%, 70%, 80%, 90%, 95%, 96%, 97%, 98%, 99%, 99.9%, 99.99%, or about 99.999% or more of the mercury that was originally present in the pollutant-containing gas. In some embodiments, elemental mercury or transformed mercury can be released from the mercury-sorbent composition; for example, less than about 1 wt %, 3 wt %, 5 wt %, 10 wt %, 20 wt %, 30 wt %, 40 wt %, 50 wt %, 60 wt %, 70 wt %, 80 wt %, 90 wt %, 95 wt %, or less than about 99 wt % of the mercury can be released from the mercury-sorbent composition prior to separation of the mercury-sorbent composition from the gas. In some examples, the majority of absorbed elemental or transformed mercury can remain part of the mercury-sorbent composition until the mercury-sorbent composition is removed in a later separation step. In some examples, transformed mercury that is released from the mercury-sorbent composition can be later removed from the gas via the separation step or another step. In some examples, elemental or transformed mercury that has been released from the mercury-sorbent composition can contact activated carbon sorbent to form a mercury-sorbent composition, to be removed later via the separation step.

The method of reducing the pollutant content in a pollutant-containing gas can include separating at least some of the pollutant-sorbent composition from the pollutant-containing gas, to give separated gas. In some embodiments, separating at least some of the pollutant-sorbent composition from the pollutant containing gas includes separating in a particulate separator. The particulate separator can be any suitable particulate separator, such as an electrostatic precipitator (ESP), a baghouse, a wet scrubber, a filter, cyclone, fabric separator, or any combination thereof. In some embodiments, an electrostatic precipitator can be used, followed by a scrubber. In other embodiments, an electrostatic precipitator can be used without a scrubber, or another particulate separator can be used. Some devices that can function as particulate separators can also have other functions, for example a scrubber can also remove $SO_2$ or $SO_3$. In embodiments that include contacting of the mercury with a sorbent in an aqueous phase, e.g. in a scrubber, the removal of mercury from the gas that occurs within the aqueous phase by reaction or interaction of the mercury with the sorbent in the aqueous phase can be considered separation of the mercury-sorbent composition from the gas.

In some examples, by separating the particulates from the mercury-containing gas, at least about 20 wt %, 30 wt %, 40 wt %, 50 wt %, 60 wt %, 70 wt %, 80 wt %, 90 wt %, 95 wt %, 96 wt %, 97 wt %, 98 wt %, 99 wt %, 99.9 wt %, 99.99 wt %, or about 99.999 wt % or more mercury can be removed from the mercury-containing gas stream. As discussed herein, the mercury can be removed in the form of elemental mercury, or in the form of a transformed mercury, such as an organomercury compound including the mercury bound to the carbon framework of the activated carbon or as Hg(II) complexed with a suitable counterion.

In some embodiments, at least one of the contacting and the separating occurs in an aqueous scrubber. The aqueous scrubber can be any suitable aqueous scrubber. For example, the scrubber can include an aqueous slurry that includes the activated carbon sorbent.

In some embodiments, the method removes about 1% or less, or about 2%, 3, 4, 5, 10, 20, 30, 40, 50, 60, 70, 80, 85, 90, 91, 92, 93, 94, 95, 96, 97, 98, 99, 99.5, 99.9, 99.99, 99.999, or about 99.9999% or more of the mercury present in the mercury-containing gas (e.g. the final concentration of mercury divided by the initial concentration of mercury). In some embodiments, the activated carbon sorbent combines with about 50-100 wt % of the mercury present in the mercury-containing gas, or about 60-90 wt %, 60-80 wt %, 70-80 wt %, 80-90 wt %, 90-100 wt %, or about 95-100 wt % or the mercury present in the mercury-containing gas.

In some embodiments, the concentration of sulfur(VI) in the mercury-containing gas (e.g. from $SO_3$, $H_2SO_4$, and the like) is greater than about 3 ppm (by mole) and a first quantity of the activated carbon sorbent forms a mercury-sorbent composition at a first mercury adsorption rate, wherein the first adsorption rate is higher than a mercury absorption rate under substantially similar conditions of the first quantity of a corresponding activated carbon sorbent including at least one of a) less or substantially no nitrogen in a corresponding surface layer, b) less or substantially no halide- or halogen-promotion, and c) less or substantially no inorganic matrix support. In some embodiments, the concentration of $SO_3$ in the pollutant-containing gas at or near the location wherein the pollutant-containing gas contacts the sorbent is about 1 ppm to about 100,000 ppm, 2-10,000 ppm, 3 ppm-1000 ppm, 3-100 ppm, 3-50 ppm, 3-10 ppm, or about 3-6 ppm or more, or the concentration of sulfur(VI) in the pollutant-containing gas (e.g. from $SO_3$, $H_2SO_4$, and the like) at or near the location wherein the pollutant-containing gas contacts the sorbent is about 1 ppm to about 100,000 ppm, 2-10,000 ppm, 3 ppm-1000 ppm, 3-100 ppm, 3-50 ppm, 3-10 ppm, or about 3-6 ppm or more, wherein ppm designates parts per million by mole. The concentration can be an instantaneous concentration, or an average concentration over time. The nitrogen in the surface layer of the activated carbon sorbent particles can decrease neutralization of carbocations in the activated carbon by at least one of $SO_3^{2-}$ and $HSO_3^{1-}$, as compared to a corresponding activated carbon sorbent including less or substantially no nitrogen in a corresponding surface layer under substantially similar conditions. The nitrogen in the surface layer of the activated carbon sorbent particles can at least partially block carbocations in the activated carbon from at least one of $SO_3^{2-}$ and $HSO_3^{-1}$, as compared to a corresponding activated carbon sorbent including less or substantially no nitrogen in a corresponding particle surface layer under substantially similar conditions.

In some embodiments, the method of reducing the pollutant content in a pollutant-containing gas includes at least one of during and prior to the contacting adding or injecting an alkaline component into the pollutant-containing gas. The alkaline component can be any suitable alkaline component, such as an oxide, hydroxide, carbonate, or phosphate of an alkali element, an alkali or alkaline-earth element, and a compound or material including the same. In various examples, the addition of an alkaline component separately or with the carbon sorbent can result in improved mercury capture. Various factors can impact the effectiveness of the alkaline addition, such as, for example, flue gas pollutants, flue gas constituents (e.g., $SO_2$, $NO_x$, Se, HCl, and the like), operating temperature, mercury form, and mercury concentration. In some examples, the alkaline-to-activated-carbon ratio can be adjusted to optimize for a given set of site conditions.

In some embodiments, the activated carbon includes a stabilizing agent. In some examples, the stabilizing agent can include at least one of S, Se, $H_2S$, $SO_2$, $H_2Se$, $SeO_2$, $CS_2$, $P_2S_5$, or mixtures thereof. The stabilizing agent can be added before or after promotion.

In various embodiments, the rate of mercury removal can decrease gradually with increasing temperature and with increased loading of mercury, at least partially due to the increase in the rate of a reverse reaction. In some examples, the highest rates can occur at about 100 to 150° C., 50-200° C., or about 50-250° C. In some examples, at 400° C., the reverse reaction can be highly favored thermodynamically. In some examples, the activated carbon can be regenerated by washing with water to remove sulfuric acid thereon, such as described in U.S. Pat. No. 8,173,566.

In some embodiments, the method of reducing the pollutant content in a pollutant-containing gas can include regenerating the pollutant-sorbent composition to give a regenerated activated carbon sorbent. The regeneration can be any suitable regeneration that allows the regenerated activated carbon sorbent to be reused for removing pollutant from the pollutant-containing gas. The method can include using the regenerated activated carbon sorbent to remove the pollutant from the pollutant-containing gas.

Method of Making Activated Carbon Including Nitrogen.

In some embodiments, the activated carbon including activated carbon particles including nitrogen is commercially acquired. In other embodiments, the activated carbon including nitrogen is synthesized. For example, the method of reducing the pollutant content in a pollutant-containing gas can include making an activated carbon including nitrogen.

For example, in the method of reducing the pollutant content in a pollutant-containing gas, obtaining or providing the activated carbon sorbent can include obtaining or providing a carbon precursor including nitrogen. The method can also include processing (e.g., heating) the carbon precursor, to provide the activated carbon sorbent. The processing can include any suitable processing. In methods that include heating the carbon precursor, the method can include any other suitable optional step in addition to the heating, such as washing, chemical treatment, or vibration. In some embodiments, the carbon precursor includes a carbonaceous material including carbon and a nitrogenous material including nitrogen. The heating can include heating to about 100° C. to 15,000° C., 200° C. to 10,000° C., 300° C. to 9000° C., or about 400° C. to 8000° C.

The carbonaceous material can be any suitable carbonaceous material. For example, the carbonaceous material can be an organic compound. In some examples, the carbonaceous material includes at least one of brown sugar, barley sugar, caramel, cane sugar, corn syrup, starch, molasses, molasses raffinate (sugar waste product), glucans, galactans, xylans, and a sugar waste product. In some examples, the carbonaceous material includes powdered activated carbon, granular activated carbon, carbon black, carbon fiber, carbon honeycomb or plate structure, aerogel carbon film, pyrolysis char, or an activated carbon or regenerated activated carbon with a mass mean particle size greater than fly ash in a flue gas stream to be treated. The nitrogen can be derived from or part of can be any suitable nitrogenous material. For example, the nitrogenous material can be a nitrogen-containing organic compound, such as a nitrogen-containing heterocycle. In some examples, the nitrogenous material includes indole, quinoxaline, carbazole, isoquinoline, piperazine, quinolone, quinoxaline, diazabicyclooctane, polyacrylonitrile, polyvinylpyrrolidone, vinylpyrrolidone-vinyl acetate copolymer, vinylpyrrolidone-acrylic acid copolymer, vinylpyrrolidone-maleic acid copolymer, polyethylenimine, an amino acid (e.g., alanine, arginine, asparagine, aspartic acid, cysteine, glutamine, glutamic acid, glycine, histidine, isoleucine, leucine, lysine, methionine, phenylalanine, proline, serine, threonine, tryptophan, tyrosine, or valine), analine, nitrobenzene, hydroxylamine, urea, hydrazine, sulfamic acid, nitriles, carbamates, isocyanates, urethanes, or a combination thereof. The nitrogenous material can be any suitable ammonium salt, such as an ammonium salt derived from an aliphatic nitrogen-containing compound, an aromatic amine-containing compound, or a heterocyclic nitrogen-containing compound; in embodiments wherein the nitrogenous material is a halide salt, the activated carbon including nitrogen perform equivalently to an promoted material and a promotion step can be skipped or reduced. In some examples, the nitrogenous material can be at least one of ammonia, ammonium bromide, ammonium chloride, nitric acid, nitrous acid, nitrogen dioxide, compounds including $NO_3$, compounds including $NO_2$, and the like.

In one example, the activated carbon including activated carbon sorbent particles including nitrogen can be prepared by surface modification of any kind of activated carbon or char by applying a nitrogen-containing polymer coating or impregnation to the existing carbon or lower temperature char and recarbonizing the impregnated carbon. The coating or impregnation can include a polymer or copolymer containing a nitrogen heterocycle such as a polymerized vinylpyrrollidone. In one example of this type of carbon, poly(vinylpyrrolidone), poly(vinylpyrrolidone-co-maleic acid) or poly(vinylpyrrolidone-covinyl acetate) is used to coat the carbon surface. Upon heating or recarbonization, the impregnated mixture can form a nitrogen-containing activated carbon surface layer on the particles. The nitrogen-concentration in the surface layer of the nitrogen-containing activated carbon can be higher than the nitrogen concentration of the material prior to the surface modification or impregnation with nitrogen.

In one example, the activated carbon including nitrogen can be prepared by surface modification of an oxidized char by treatment of the char with a suitable nitrogenous compound, such as ammonia or urea, followed by activation of the nitrogen-impregnated material.

In one example, the activated carbon including nitrogen can be prepared by impregnation of nitrogen containing compounds into a char followed by carbonization and activation of the impregnated char by convention methods. One example carbon of this type is the combination of amines or amino acids with carbohydrates, which combination undergoes the Maillard condensation reaction on heating to form carbon surface containing nitrogen heterocyclics.

In one example, the activated carbon including nitrogen can be prepared by impregnation of a nitrogen containing compound into a coal, lignite, or leonardite, followed by carbonization and activation.

Promoted Activated Carbon Sorbent Including Nitrogen.

In some embodiments, the activated carbon including activated carbon sorbent particles including nitrogen includes a promoted activated carbon sorbent including nitrogen. The activated carbon sorbent including nitrogen used in the method of reducing the pollutant content in a pollutant-containing gas can be a promoted activated carbon sorbent, and can include nitrogen. The method can include promoting an unpromoted activated carbon sorbent, or the promoted sorbent can be commercially acquired.

For example, the method of reducing the pollutant content in a pollutant-containing gas can include obtaining or providing an unpromoted carbon sorbent. The unpromoted carbon sorbent can be any suitable unpromoted sorbent including nitrogen, and can be synthesized or commercially acquired. The method can include obtaining or providing a promoter. The method can include promoting at least a portion of the unpromoted sorbent by contacting (e.g., chemically reacting) the portion of the unpromoted sorbent with the promoter to form the activated carbon sorbent.

The promoter can be any suitable promoter, such that a promoted sorbent is formed that is effective for the removal of pollutants such as mercury from a pollutant-containing gas. For example, the promoter can include a halogen or halide promotor. The halogen or halide can be fluorine or fluoride, chlorine or chloride, bromine or bromide, or iodine or iodide. In some examples, the promotor can include at least one of a halogen, a Group V halide, a Group VI halide, a hydrogen halide, an ammonium halide, an alkali earth metal halide, and an alkaline earth metal halide. Thus, the activated carbon in some embodiments can be at least one of halogen-promoted, Group V halide-promoted, Group VI halide-promoted, hydrogen halide-promoted, ammonium halide-promoted, alkali earth metal halide-promoted, and alkaline earth metal halide-promoted. The promoter can include at least one of HI, IBr, ICl NH$_4$Br, NaBr, CaBr$_2$, HBr, NaCl, CaCl$_2$, and HCl. In some examples, the promoter is NH$_4$Br, and can be injected into a warm zone in a duct, for example separately or with the activated carbon sorbent. In some examples, any suitable halogen- or halide-containing material, such as NaCl, CaCl$_2$, NaBr, or CaBr$_2$ can be injected with the coal during the combustion process, which can activate the carbon. In various embodiments, the halogen- or halide-containing material can transform into an activate promotor such as active bromide or chloride compounds like HCl, HBr, xCl, or xBr. In some examples, the promoter is in a form including at least one of a vapor form, in a solvent, as a liquid, as a solid, and a combination thereof. In some embodiments, the promoting can occur in an aqueous scrubber, wherein the scrubber includes an aqueous slurry that includes the promotor.

The promoting of the sorbent material can occur before addition or injection into a gas stream, during addition or injection into a gas stream, after addition or injection into a gas stream, or a combination thereof, wherein the gas stream can be a mercury-containing gas stream, a transport stream, or a combination thereof. In some examples, the promoter can be added to the sorbent before the promoter and the sorbent react, such that the heat of the gas stream into which the promoter is added causes the promoting of the sorbent. For example, the promoter can be added as a gas, as a gas dissolved in a liquid, or as a solid such as a salt, or other substance (e.g., acid) dissolved in liquid (e.g., water), for example, hydrobromic acid. In examples wherein the promoter is added in a liquid such as water, the water can be allowed to dry, which can allow the promoter to adhere to, impregnate, or react with the activated carbon sorbent, or a combination thereof. In some examples, a pre-added promoter can be an ammonium salt, such as an ammonium chloride, an ammonium bromide, or an ammonium iodide, including, for example, mono-, di-, tri-, or tetraalkyl ammonium halides, or NH$_4^+$ halide salts. In some examples, the promoter can be added to the sorbent near to or at the time of promoting; for example, the promoter can be added to a gas stream with the sorbent or such that it contacts the sorbent within a heated gas stream, such as a mercury-containing gas stream or a feed gas stream. In some examples, the promoter can be NH$_4$Br.

In some embodiments, a promoter precursor transforms into the halogen or halide promoter that reacts with the activated carbon sorbent to give the activated carbon material. The promoter precursor can be any suitable precursor that can transform into the halogen or halide promoter. In some embodiments, the promoter precursor can be at least one of on the unpromoted sorbent and added or injected with the unpromoted sorbent. In some embodiments, the promoter can be HBr, and in some examples, the HBr can be provided via degradation or reaction of a promoter precursor such as ammonium bromide, sodium bromide, or calcium bromide. The promoter can be HCl, and in some examples, the HCl can be provided via degradation or reaction of a promoter precursor such as ammonium chloride, sodium chloride, or calcium chloride. The promoter can be HF, and in some examples, the HF can be provided via degradation or reaction of a promoter precursor such as ammonium fluoride, sodium fluoride, or calcium fluoride. In some examples, the promoter (e.g., HBr or HCl) or promoter precursor (e.g., NH$_4$Br, NaBr, CaBr$_2$, NH$_4$Cl, NaCl, CaCl$_2$)) can be added or injected in the flue gas separately from the activated carbon sorbent or with the activated carbon sorbent (e.g., can be applied to the sorbent pre-injection, added or injected simultaneously at the same location, or added or injected simultaneously at different locations). In some examples, NaCl, CaCl$_2$, NaBr, or CaBr$_2$ can be added with uncombusted material such as uncombusted coal.

Inorganic Matrix-Support or Nanocomposites.

In some embodiments, the activated carbon including activated carbon particles including nitrogen includes an inorganic matrix-support or is a nanocomposite. The activated carbon including nitrogen used in the method of reducing the pollutant content in a pollutant-containing gas can include an inorganic matrix-support or can be a nanocomposite. The method can include adding an inorganic matrix-support to the activated carbon or making a nanocomposite using unsupported activated carbon including nitrogen, or the method can include commercially acquiring the matrix-supported or nanocomposite activated carbon. In various embodiments, the inorganic matrix support includes at least one of diatomaceous earth, a clay, a zeolite, or a mineral.

For example, the method of reducing the pollutant content in a pollutant-containing gas can include obtaining or providing a substrate material. The substrate material can be any suitable substrate. For example, the substrate can be at least one of diatomaceous earth, a clay, a zeolite, or a mineral. The method can include contacting the carbon precursor and the substrate material, to provide a sorbent starting material. The contacting can take place in any suitable fashion. The contacting mixes the carbon precursor and the substrate material, such that when the conglomeration is heated (or subjected to any other suitable source of energy), the carbon nanocomposite or supported sorbent is formed. The contacting can be performed such that the carbon precursor is approximately evenly distributed on the substrate. In some examples, water or another solvent can be added to help distribute the carbon precursor on the substrate. In examples where water is included in the mixture of the carbon precursor and the substrate, the conglomeration can be dried prior to the heating. The drying can occur in any conventional manner (e.g., convective, conductive, microwave, and the like), including by heating near or above the boiling point of the solvent, in the case of water (e.g., 50° C.-120° C. or higher), at atmospheric pressure, under pressure, or under a vacuum.

The substrate can include any suitable porous material. For example, the substrate material can be diatomaceous earth, zeolites, porous minerals (e.g., clays) including, for example, smectites (e.g., montmorillonite, bentonite, nontronite, saponite), kaolins, illites, chlorites, sepiolite, or attapulgites. In some examples, the substrate can include polymers, non-metals, metals, metalloids, ceramics or mixtures, and blends, as well as composites and alloys thereof. The materials can be synthetic or naturally occurring or naturally derived materials. Examples of synthetic polymers include any common thermoplastics and thermosetting materials. Examples of metals include aluminum, titanium, copper, steel, and stainless steel. Examples of ceramics include any form of alumina, zirconia, titania, and silica. Examples of naturally occurring or naturally derived materials include wood, wood composites, paper, cellulose acetate, and geologic formations such as granite or limestone. Examples of non-metals include various forms of carbon such as graphite or carbon. Examples of metalloids include silicon or germanium. The porous material can be a construction material such as concrete or asphalt.

In some examples, the substrate material can be present in from about 1 w % to about 99 wt %, about 20 wt % to about 80 wt %, or about 40 wt % to about 60 wt % of the starting material for the carbon nanocomposite sorbent. Wt % in this paragraph refers to the percentage by weight based on the total weight of the carbon precursor and the substrate material.

The method can include processing (e.g., heating, vibrating, sonicating, microwaving, or otherwise adding energy to) the sorbent starting material, to provide the activated carbon sorbent. The contacted composition of the carbon precursor and the substrate can then be processed (e.g., heated, vibrated, sonicated, microwaved, or other suitable addition of energy) to form the carbon nanocomposite or inorganic matrix-supported sorbent. The processing can take place at any suitable temperature, such that the sorbent is sufficiently formed, for example heating to about 50° C., 100° C., 200° C., 300° C., 400° C., 500° C., 600° C., 700° C., 800° C., 900° C., 1000° C., 1100° C., or about 1200° C. or higher. The processing can take place for any suitable time, such that the carbon nanocomposite is sufficiently formed, for example, greater than about 1 min, 2 min, 5 min, 10 min, 30 min, 1 h, 1.5 h, 2 h, 3 h, 4 h, 5 h, 10 h, or greater than about 24 h. The heating can take place in any suitable apparatus, for example, a unit that substantially excludes oxygen, e.g., that allows heated inert gas air to flow around the mixture being heated. In one example, the heating occurs in a furnace having an inert gas environment therein. The processing can be accelerated, or lengthened, depending on the apparatus and the nanocomposite or supported material.

In some embodiments, heating the sorbent starting material can provide a second sorbent starting material. The method can further include reacting the second sorbent starting material with an acidic or basic material, to provide the activated carbon sorbent. The acidic or basic material can be any suitable acidic or basic material, such as HBr, HCl, $H_2SO_4$, KOH, NaOH, and the like. In some embodiments, treatment with an acidic or basic material can prepare the activated carbon for treatment with a promotor or can prepare the material such that sufficient reactivity or absorption with mercury or another pollutant is obtained.

Method of Making an Active Carbon Sorbent Including Nitrogen.

In various embodiments, the present invention provides a method of making an activated carbon sorbent including activated carbon sorbent particles including nitrogen. Embodiments of the present invention can include any activated carbon sorbent including nitrogen made by the method. The method includes obtaining or providing unpromoted sorbent including nitrogen. The unpromoted sorbent including nitrogen can be any suitable activated carbon sorbent including nitrogen, such as any activated carbon sorbent including nitrogen described herein. The unpromoted sorbent including nitrogen can be acquired commercially or can be synthesized. The method can include promoting at least a portion of the unpromoted sorbent. The promoting can include contacting (e.g., chemically reacting) the portion of the unpromoted sorbent with a promoter to form an activated carbon sorbent including activated carbon sorbent particles including nitrogen.

In some examples, the unpromoted sorbent including nitrogen can include an inorganic matrix support or can be a nanocomposite. For example, the method of making an activated carbon sorbent including nitrogen can include obtaining or providing a carbon precursor including nitrogen. The method can include obtaining or providing a substrate material. The method can include contacting the carbon precursor and the substrate material to provide a sorbent starting material. The method can also include heating the sorbent starting material to provide the unpromoted carbon sorbent including nitrogen. The unpromoted sorbent including nitrogen can include activated carbon sorbent particles including nitrogen.

In some embodiments, the method of making an activated carbon sorbent including nitrogen can include synthesizing the carbon precursor including nitrogen from carbonaceous and nitrogenous materials. For example, the method can include obtaining or providing a carbonaceous material including carbon and a nitrogenous material including nitrogen. The method can include suitably contacting and processing the carbonaceous material and the nitrogenous material, wherein processing can including at least one of heating, microwaving, sonication, vibration, and the like, to provide the carbon precursor including nitrogen.

EXAMPLES

The present invention can be better understood by reference to the following examples which are offered by way of illustration. The present invention is not limited to the examples given herein.

Example 1. Impregnation of Nitrogen Precursors into a Char Followed by Carbonization and Activation of the Impregnated Char Example 1a. Carbon Precursor A carbon (20×60 mesh) prepared by steam activation of a lignite char was stirred with an aqueous solution of dextrose and ethanolamine in ratio of 1 part of carbon to 0.016 parts of ethanolamine and 0.034 parts of dextrose. The water solvent was removed by rotovaporation and the impregnated carbon was air-dried. The dried material was reactivated at 750° C. for 2 hours under nitrogen stream.

Example 1b. Char Precursor

A char (20×60 mesh) prepared by heating a lignite at 400° C. was stirred with an aqueous solution of dextrose and ethanolamine in ratio of 1 part of carbon to 0.016 parts of ethanolamine and 0.034 parts of dextrose. The water solvent was removed by rotovaporation and the impregnated carbon was air-dried. The dried material was activated at 750° C. for 2 hours under nitrogen stream.

Example 1c. Wood Charcoal Precursor

A carbon (20×60 mesh) prepared by steam activation of a wood char was stirred with an aqueous solution of dextrose and ethanolamine in ratio of 1 part of carbon to 0.016 parts of ethanolamine and 0.034 parts of dextrose. The water solvent was removed by rotovaporation and the impregnated carbon was air-dried. The dried material was reactivated at 750° C. for 2 hours under nitrogen stream.

Example 1d. Wood Charcoal—Alanine

A carbon (20×60 mesh) prepared by steam activation of a wood char was stirred with an aqueous solution of dextrose and alanine in ratio of 1 part of carbon to 0.016 parts of ethanolamine and 0.034 parts of alanine. The water solvent was removed by rotovaporation and the impregnated carbon was air-dried. The dried material was reactivated at 750° C. for 2 hours under nitrogen stream.

Example 2. Tube Reactor Testing

The molecular sieve carbons obtained as described in Examples 1a-d were impregnated with 5 wt % of sulfuric acid. The impregnated carbon was then dried in an oven at 110° C. The carbon (0.100 g) was packed into a 3 mm diameter pyrex tube and held in place by glass wool plugs at both ends. A constriction in the pyrex tube at exit end prevented the plug from blowing out. The reactor tube was heated in a GC oven at 150° C.±0.50 as a constant temperature device. The mercury vapor was contained in an air flow of 100 cm$^3$/min through the reactor tube at a concentration of 429-447 micrograms/m$^3$, determined with a continuous mercury vapor monitor.

The mercury source was a temperature-calibrated permeation tube. The permeation tube was heated in a double-jacketed glass condenser with a circulating hot silicone oil system. The concentration in the effluent air stream from the reactor tube was monitored with a continuous cold-vapor UV mercury vapor monitor (EPM). Blank runs were conducted before each carbon test to determine the mercury concentration. The instrument was zeroed with an air stream passed through a large iodized carbon filter. This apparatus thus gave the percent of mercury not removed by the carbon bed (the concentration of mercury in the outlet divided by the concentration of mercury in the inlet, times 100). For the nitrogenous molecular sieve carbons (examples 1-4) only 1% of the mercury vapor was not removed by the carbon bed over a period of several hours.

Example 3. Filter Bed Testing

The sorbent carbon pretreated as in Example 1e was ground to about 200 mesh and introduced into a tube where it could be drawn by reduced pressure onto a teflon or quartz filter held in a stainless steel holder. The carbon-impregnated filter and holder were then placed in the oven under air flow and tested as described in Example 2.

Examples 4. Impregnation of Nitrogen-Containing Polymers into an Activated Carbon or Char Followed by Carbonization and Activation of the Impregnated Material Example 4a. Vinylpyrrolidone-Acrylic Acid Copolymer A carbon prepared by steam activation of a lignite was stirred with an aqueous solution of poly(vinylpyrrolidone-co-acrylic acid) for 30 min. The amount of the polymer was selected to provide loadings of 1% to 30% by weight. The solvent was evaporated by rotovaping at 50° C. and further dried in an oven at 110° C. The impregnated carbon was reactivated by heating at 750° C. for 2 hours in a stream of nitrogen. Approximately 40% of the polymer weight was converted to surface coating and 60% was volatilized.

Example 4b. Vinylpyrrolidone-Vinyl Acetate Copolymer

An activated carbon was impregnated with poly(vinylpyrrolidone-co-vinyl acetate) dissolved in dichloromethane. The solvent was evaporated and the impregnated carbon died in an oven at 110° C. The impregnated carbon was then activated by heating at 750° C. for 2 hours in a nitrogen stream.

Example 4c. Poly(vinylpyrrolidone)

An activated carbon was impregnated with one of poly (vinylpyrrolidone) and the copolymers described in Examples 4a-b and activated as described in Example 4a.

Example 4d. Poly(vinylpyrrolidone)

A KOH-activated lignite was impregnated with one of polyvinylpyrrolidone and and the copolymers described in Examples 4a-4b and activated as described in Example 4a.

Example 4e. Wood-Derived Charcoal

Wood-derived charcoal was impregnated with one of poly(vinylpyrrolidone) and the copolymers described in Examples 4a-4b and activated as described in Example 4a.

Example 4f. Carbonization of a Lignite.
(Hypothetical Example)

Chars are produced by carbonization of a lignite, impregnated by one of poly(vinylpyrrolidone) and the copolymers described in Examples 4a-4b, and activated as described in Example 4a. As an alternative, steam activation can be used.

Example 4g. Steam Activation

Examples 4a-4e were carried out using steam activation of the carbon material impregnated with nitrogen-containing polymers to generate effective sorbents.

Example 5. Impregnation of Nitrogen Precursors into a Coal, Lignite, or Leonardite, Followed by Carbonization and Activation of the Impregnated Material Example 5a. 1.4-Diazabicyclo[2.2.2]octane (DABCO)

Lignite (as received) was stirred with an aqueous solution of DABCO in a ratio of 1 part of coal to 0.02 parts of DABCO. The water solvent was removed by filtration, and the impregnated coal was air-dried. The dried material was carbonized at 400° C. and activated at 750° C. for 2 hours under a nitrogen stream.

Example 5b. Sulfamic Acid

Lignite (as received) was stirred with an aqueous solution of sulfamic acid in a ratio of 1 part of coal to 0.02 parts of sulfamic acid. The water solvent was removed by filtration, and the impregnated coal was air-dried. The dried material was carbonized and activated at 750° C. for 2 hours under a nitrogen stream.

Example 5c. Carbonized Lignite

Lignite was carbonized at 400° C. for 30 minutes, and the resulting char was treated by stirring with sulfamic acid solution as described in Example 5b. The treated char was then activated as described in Example 5b.

Example 5d. Steam Activation

Steam activation of the DABCO or sulfamic acid-impregnated chars was also effective in producing mercury sorbent carbons.

Example 6. Preparation of Nitrogen-Containing Pitches

Nitrogen-containing pitches were prepared using a procedure reported by Mochida et al. (Mochida, I.; An, K. H.; Korai, Y. *Carbon* 1995, 33, 1069). Preparations are summarized in Table 1. As an example, a mixture of isoquinoline (26 g, 0.2 mole), anhydrous aluminum(III) chloride (13.3 g, 0.25 mole), and nitrobenzene (7.68 g, 0.06 mole) was placed in a two-necked flask equipped with a reflux condenser and a nitrogen inlet tube. The mixture was refluxed at 280° C. for 4 hours. The residue was extracted with 0.1 N hydrochloric acid and filtered. The residue was washed with 0.1 N hydrochloric acid. The residue was further extracted with methanol to remove any monomer. The methanol-insoluble pitch was dried in vacuo. The yield of the pitch was 49/o. A portion of the nitrogen-containing pitches were carbonized using Procedure A or B in a nitrogen stream, as described in Example 7.

Several modifications of the method were utilized for the quinoline polymerization. In addition to the flask method, a Parr reactor was used for the reaction, and temperatures and reaction times were varied. The yields are reported in Table 2. In this procedure, 64.5 g of quinoline and 33.25 g of aluminum(III) chloride were placed in a 300-mL Parr autoclave. The reactor was sealed under nitrogen and heated at 280° C. for 4 hours. The hard black mass was extracted with 0.1 N hydrochloric acid followed by extraction with methanol and drying in vacuo. In order to determine the solubility of the polymer, a 10-g portion of this black mass was extracted with 100 mL of ethanol. Extraction data showed that 27 wt % of the product dissolved in ethanol.

TABLE 2

Preparation of nitrogen-containing pitches.

| Quinoline (g) | AlCl$_3$ (g) | Temp. (° C.) | Time (hr) | Yield (g, %) | Ethanol-S (g) | Ethanol-I (g) |
|---|---|---|---|---|---|---|
| 64.5 | 33.25 | 280 | 12 | 57.7 (89%) | — | — |
| 64.5* | 33.25 | 175 | 12 | 0 (0%) | — | — |
| 64.5* | 33.25 | 280 | 12 | 59.1 (92%) | — | — |
| 64.5* | 33.25 | 280 | 4 | 56.8 (88%) | 7.3** (73%) | 2.7 (27%) |

*indicates reactions carried out in 300-mL Parr reactor.
**indicates 10 g of pitch was extracted with ethanol.

Example 7. Preparation of Nitrogen-Impregnated Carbon

Impregnations and recarbonizations were performed to investigate the effects of precursor concentration, activation procedure, and sorbent particle size on mercury sorption. The precursor base carbon, granular activated carbon (Calgon F400 or Gascoyne AC, 20×60) was impregnated with various nitrogen-containing polymers and pitches using an incipient wetness method, described below. For the fine-particle sorbent tests in flue gas compositions, the Calgon carbon was ground to about a 400 mesh size prior to impregnation. The nitrogen polymers such as vinylpyrrolidone polymers and copolymers are commercially available.

TABLE 1

Preparation of nitrogen-containing pitches.

| Substrate (g, mole) | Catalyst (g, mole) | Cocatalyst (g, mole) | Temperature (° C.) | Time (hr) | Yield (g, %) | Soluble (%) |
|---|---|---|---|---|---|---|
| Indole (10, 0.77) | None | None | 253* | 4 | 9.6 (96%) | Methanol (100) |
| Quinoxaline (26, 0.2) | AlCl$_3$ (13.3, 0.1) | Nitrobenzene (7.68, 0.06) | 225* | 4 | 13.5 (52%) | EDA** |
| Carbazole (16.7, 0.1) | AlCl$_3$ (27.7, 0.2) | Nitrobenzene (3.6, 0.03) | 25 | 12 | 59.1 (92%) | EDA** |
| Isoquinoline (26, 0.2) | AlCl$_3$ (13.3, 0.1) | Nitrobenzene (7.68, 0.06) | 280 | 4 | 6.5 (25%) | EDA** |

*indicates reactions carried out in 300-mL Parr reactor.
**indicates ethylenediamine.

The urea, alanine-dextrose, piperazine-dextrose, and polyethylenimine-dextrose compositions were prepared similarly.

In a typical procedure for the incipient wetness method, the desired amount of polymer or pitch dissolved in an appropriate solvent was added to the carbon slowly with thorough mixing. The paste was dried to remove solvent. The dried product was packed in a stainless steel tube and activated in a gentle flow of nitrogen using procedure A or procedure B.

Procedure A included: Heated from 25° C. to 400° C. at 10° C./min; held at 400° C. for 30 min; heated from 400° to 750° C. at 20° C./min; and held at 750° C. for 4 hr.

Procedure B included: Heat from 25° C. to 225° C. at 15° C./min; heated from 225° C. 270° C. at 1° C./min; held at 270° C. for 1 hr; cooled to room temperature; heated up to 750° C. at 15° C./min; and held at 750° C. for 4 hr.

Example 8. Preparation of Nitrogen-Containing Carbons from Insoluble Fractions Insoluble fractions of pitches described in Table 1 were converted into nitrogen-containing carbons by heating in a gentle flow of nitrogen using Procedure B as described above. The resulting carbons were porous glassy materials, similar to cokes.

Example 9. Preliminary Screening of Sorbents Made Using the Nitrogen Containing Materials of Examples 6-7 for Mercury Capture

Example 9a. Simulation of the Sulfuric Acid Accumulation

Capture of $SO_3$ and subsequent sulfuric acid formation on the surface of the nitrogen containing carbons in the hot flue gas stream was simulated by adding 5 wt % sulfuric acid by the incipient wetness method. The acid-impregnated carbons were dried at 110° C.

Example 9b. Packed-Bed Tests

Packed-bed tests in airflow were conducted on the granular carbon products to evaluate the effects of surface modification. The mercury sorption was tested in a flow-through tubular reactor system equipped with continuous in-line mercury analysis of the effluent from the bed to determine mercury removal rates as a function of time. Integration of breakthrough volumes allows determination of mercury sorption per unit mass carbon (mg/g). Air with an elemental mercury concentration of 56 or 81 µg/m³ was passed through the heated (150° C.) reactor. To obtain this concentration, the mercury source was placed in a double-jacketed glass condenser and heated to the desired temperature by pumping hot oil through the condenser.

A glass tube with constriction and glass wool plug was used as the reactor for the mercury sorption tests. A gas chromatography (GC) oven was used as a constant temperature (150° C.) chamber for the reactor. Before the actual test, a blank test was run. The glass tube was attached to the source and the mercury analyzer by Teflon tubes. Mercury vapors diluted with air (2000-4000 cm³/min or 4-8 scfh measured at the detector end) were passed through the tube. The mercury analyzer (Environmental and Process Monitoring [EPM] continuous vapor monitor) was interfaced to a Hydra and personal computer (PC) to record the data. For the packed-bed tests, impregnated activated carbons (20× 60-mesh size) were used. In an actual test, about 0.2-0.6 g of sorbent was packed in the glass tube and held by glass wool plugs on both ends. The tests were conducted with a source temperature of 150° C., an oven temperature of 150° C., and an airflow=4 or 8 scfh (4000 cm³/min). Numerous tests were performed at 4000 cm³/min (8 scfh) with carbons prepared by impregnation of various nitrogen compounds, polymers, and pitches into a base Calgon carbon (Tables 3 and 4). These conditions gave partial breakthroughs for the sorbents and allowed comparisons of their kinetic activities.

TABLE 3

Sorbent testing of surface-treated carbons for mercury removal at 8 scfh. Airflow = 4000 cm³/min (8 scfh), over temperature = 150° C., mercury concentration = 81 µg/m³.

| Carbon source | Recarbonization method | $H_2SO_4$ Impregnation | % Hg removed (time, min) | | |
|---|---|---|---|---|---|
| | | | Initial | 50% | End of test |
| Blank | — | — | 0 (0) | <1 | — |
| Calgon | | 5% | 87 (0) | 50 (171) | 38 (304) |
| Calgon/urea | A | 5% | 95 (0) | 50 (305) | 49 (306) |
| EERC*/urea | A | 5% | 100 (0) | 50 (575) | 38 (1221) |
| Calgon/2% sulfamic acid | A | 5% | 92 (0) | 50 (226) | 39 (1303) |
| Calgon/5% PVP | A | 5% | 94 (0) | 50 (2217) | 42 (2574) |
| Calgon/10% PVP | A | 5% | 88 (0) | 50 (150) | 55 (253) |
| Calgon/10% PVP | A | 5% | 90 (0) | 50 (300) | 65 (1098) |
| Calgon/5% PVP | A | 5% | 98 (0) | 50 (3315) | 43 (4010) |
| Calgon/2% PVP | A | 5% | 79 (0) | 50 (312) | 49 (320) |
| Calgon/10% PVP | A | 5% | 85 (0) | 50 (424) | 30 (1114) |
| Calgon/5% vinylpyrrolidone-vinyl acetate copolymer | A | 5% | 90 (0) | 50 (84) | 39 (180) |
| Calgon/5% vinylpyrrolidone-acrylic acid copolymer | A | 5% | 90 (0) | 50 (76) | 29 (362) |
| Calgon/5% vinylpyrrolidone-acrylic acid copolymer | A | 5% | 98 (0) | 50 (223) | 50 (223) |
| Calgon/polyethylenimine | A | 5% | 88 (0) | 50 (373) | 22 (1147) |
| Calgon/dextrose + polyethylenimine | A | 5% | 88 (0) | 50 (51) | 35 (350) |
| Calgon/dextrose + alanine | A | 5% | 88 (0) | 50 (76) | 53 (216) |
| Calgon/dextrose + piperazine | A | 5% | 65 (0) | 50 (35) | 25 (942) |

*indicates that the activated carbon was prepared in Example 4a.

TABLE 4

Sorbent testing of nitrogenous pitch-impregnated carbons for mercury capture. Recarbonization procedure B was used for all samples. Sorbent = 0.20 g, particle size = 20 × 50 mesh, airflow = 8 scfh (4000 mL/min), source temperature = 150° C., oven temperature = 150° C.

| File name | Sorbent (g) | $H_2SO_4$ (wt %) | Mercury Concentration ($\mu g/m^3$) | % Hg removed (time, min) Initial | 50% | Final |
|---|---|---|---|---|---|---|
| RKS32 | None | — | 81 | — | 50 <1 | — |
| RKS35 | Calgon/5 wt % quinolone* | 5% | — | 89 (0) | 50 (306) | 49 (308) |
| RKS23 | Calgon/5 wt % quinolone** | 5% | — | 91 (0) | 50 (204) | 46 (292) |
| RKS37 | Calgon/5 wt % quinoxaline | 5% | — | 90 (0) | 50 (632) | 25 (1300) |
| RKS31 | Calgon/5 wt % isoquinoline | 5% | — | 90 (0) | 54 (584) | 34 (1214) |
| RKS75 | Calgon/5 wt % indole | 5% | — | 98 (0) | 50 (1403) | 49 (1473) |

*indicates pitch obtained from heating quinolone and aluminum(III) chloride in Parr reactor was dissolved in ethanol and impregnated on Calgon carbon.
**indicates pitch obtained from refluxing of quinolone with aluminum(III) chloride was dissolved in EDA and impregnated on Calgon carbon.

Example 9c. Test Results

Carbons prepared by impregnation of urea or sulfamic acid into the Calgon base carbon and recarbonization gave initial capture rates of 95% or 92%, respectively. These results are significantly better than those observed with the unmodified Calgon carbon. Testing the urea carbon at lower temperature (75° C.) gave 100% initial capture. Carbons prepared by impregnation of a nitrogen-containing polymer were highly active in these tests. The sorbent prepared by impregnation of 5 wt % PVP and activated using procedure A (fast heating rate) demonstrated superior activity. The initial removal was 94%, and the decrease to 50% removal required 2217 min. Thus this sorbent retains its high activity far longer than the urea carbon. The sorbent prepared using 10% PVP (also Procedure A) was less active (initially 88% removal, decreasing to 50% at 150 min.

Using procedure B (slower heating rate) gave more active sorbent at the 10% PVP concentration level. Another set of carbons was prepared with different concentrations using Procedure B. Again, the impregnation with 5% concentration of PVP resulted in high activity (initially 98% removal, decreasing to 50% at 3315 mm). The 10% PVP was again less active, and the 2% PVP concentration was the least active.

The carbons prepared from the copolymers of PVP were also prepared and evaluated. The copolymer with vinyl acetate (PVPcoVA) impregnated at 5% concentration (Procedure A) gave a sorbent with relatively low activity. The poly(vinylpyrrolidone-co-acrylic acid) (PVPcOAA) at 5% also gave a low activity sorbent. Using Procedure B for activation improved the activity slightly.

Another type of N-polymer-impregnated carbon was prepared using polyethylenimine. This polymer precursor contains nitrogen in the polymer backbone, in contrast to the PVP where the nitrogen is attached to the carbon chain backbone. The activity was similar to that of the 10% PVP polymers.

Several carbons were prepared by impregnating mixtures of dextrose and amines. None of these exhibited high activities in these tests. Previous tests showed that the dextrose+alanine-impregnated carbon (Procedure B) was fairly active. Since Procedure A was used in the present study, decreases in activity might be related to the fast heating rate used. It may be quite beneficial to perform the reaction slowly in preparing sorbents from these precursors.

The sorbents prepared by impregnation of the nitrogenous pitches prepared by polymerization of various heterocyclics were all fairly active (Table 4), but significant differences in activity were observed. The N-carbon prepared from impregnation of quinoxaline pitch was 2-3 times more active than the quinoline-derived N-carbon. The activity of the isoquinoline-derived carbon was also very high. The high activity of the indole-derived carbon was also of great interest. It is an important lead since indoles are more readily available than the quinoxaline precursors.

Testing was also conducted on the carbonized pitches prepared from the insoluble fractions of the nitrogenous pitches. The activities of the carbonized pitches were very poor. Initial breakthrough was substantial, with percent removals of 21% to 54%, possibly related to the the glassy nature of the carbonized pitches. Although the surface areas were not determined, they may be very low, since the materials did not resemble activated carbons but, rather, cokes.

The terms and expressions which have been employed are used as terms of description and not of limitation, and there is no intention that in the use of such terms and expressions of excluding any equivalents of the features shown and described or portions thereof, but it is recognized that various modifications are possible within the scope of the invention claimed. Thus, it should be understood that although the present invention has been specifically disclosed by preferred embodiments and optional features, modification and variation of the concepts herein disclosed may be resorted to by those of ordinary skill in the art, and that such modifications and variations are considered to be within the scope of this invention as defined by the appended claims.

ADDITIONAL EMBODIMENTS

The present invention provides for the following exemplary embodiments, the numbering of which is not to be construed as designating levels of importance:

Embodiment 1 provides a method of reducing the pollutant content in a pollutant-containing gas, the method comprising: obtaining or providing an activated carbon sorbent comprising activated carbon sorbent particles comprising nitrogen in a surface layer of the sorbent particles; contacting a pollutant-containing gas with the activated carbon sorbent, to form a pollutant-sorbent composition; and separating at least some of the pollutant-sorbent composition from the pollutant-containing gas, to give a separated gas.

Embodiment 2 provides the method of Embodiment 1, wherein the pollutant comprises mercury, and the pollutant-containing gas is a mercury-containing gas.

Embodiment 3 provides the method of any one of Embodiments 1-2, wherein the concentration of nitrogen in the surface layer of the sorbent particles is higher than the concentration of nitrogen in a core of the sorbent particles.

Embodiment 4 provides the method of any one of Embodiments 2-3, wherein the activated carbon sorbent combines with at least about 70 wt % of the mercury present in the mercury-containing gas.

Embodiment 5 provides the method of any one of Embodiments 2-4, wherein the mercury-containing gas further comprises a concentration of sulfur(VI) and the concentration of sulfur(VI) in the mercury-containing gas is greater than about 3 ppm by mole and the activated carbon sorbent forms a mercury-sorbent composition at a higher absorption rate relative to a corresponding activated carbon sorbent comprising at least one of a) less or substantially no nitrogen in a corresponding particle surface layer, b) less or substantially no halide- or halogen-promotion, wherein the activated carbon sorbent comprising the activated carbon sorbent particles is halide- or halogen-promoted, and c) less or substantially no inorganic matrix support, wherein the activated carbon sorbent comprising the activated sorbent particles is inorganic matrix-supported.

Embodiment 6 provides the method of any one of Embodiments 1-5, wherein the pollutant-containing gas further comprises a concentration of sulfur(VI) and the concentration of sulfur(VI) in the pollutant-containing gas is about 3 ppm-2000 ppm.

Embodiment 7 provides the method of any one of Embodiments 1-6, wherein the nitrogen is substantially homogenously distributed in the core of the activated carbon sorbent particles.

Embodiment 8 provides the method of any one of Embodiments 1-7, wherein the nitrogen in the surface layer decreases neutralization of carbocations in the activated carbon by at least one of $SO_3^{2-}$ and $HSO_3^{1-}$, as compared to a corresponding activated carbon sorbent comprising less or substantially no nitrogen in a corresponding particle surface layer.

Embodiment 9 provides the method of any one of Embodiments 1-8, wherein the nitrogen in the surface layer at least partially blocks carbocations in the activated carbon from at least one of $SO_3^{2-}$ and $HSO_3^{1-}$, as compared to a corresponding activated carbon sorbent comprising less or substantially no nitrogen in a corresponding particle surface layer.

Embodiment 10 provides the method of any one of Embodiments 1-9, further comprising: obtaining or providing an unpromoted carbon sorbent; obtaining or providing a promoter; and promoting at least a portion of the unpromoted sorbent by contacting the portion of the unpromoted sorbent with the promoter to form the activated carbon sorbent.

Embodiment 11 provides the method of Embodiment 10, wherein the promoter comprises a halogen or halide promoter.

Embodiment 12 provides the method of any one of Embodiments 10-11, wherein the promoter comprises at least one of a halogen, a Group V halide, a Group VI halide, a hydrogen halide, an ammonium halide, an alkali earth metal halide, and an alkaline earth metal halide.

Embodiment 13 provides the method of any one of Embodiments 10-12, wherein the promoter comprises at least one of HI, IBr, ICl $NH_4Br$, NaBr, $CaBr_2$, HBr, NaCl, $CaCl_2$, and HCl.

Embodiment 14 provides the method of any one of Embodiments 10-13, wherein the promoter is in a form comprising at least one of a vapor form, in a solvent, as a liquid, as a solid, and a combination thereof.

Embodiment 15 provides the method of any one of Embodiments 10-14, wherein the promoting occurs in an aqueous scrubber, wherein the scrubber comprises an aqueous slurry that comprises the promotor.

Embodiment 16 provides the method of any one of Embodiments 1-15, wherein contacting the pollutant-containing gas with the activated carbon sorbent comprises adding the activated carbon sorbent into the pollutant-containing gas.

Embodiment 17 provides the method of any one of Embodiments 1-16, wherein the activated carbon sorbent is at least one of in a fixed bed, in a moving bed, in a scrubber, in a filter, or suspended in the pollutant-containing gas.

Embodiment 18 provides the method of any one of Embodiments 1-17, wherein the core of the activated carbon sorbent particles comprise about 0 wt %-about 99 wt % nitrogen.

Embodiment 19 provides the method of any one of Embodiments 1-18, wherein the core of the activated carbon sorbent particles comprise about 1 wt %-about 6 wt % nitrogen.

Embodiment 20 provides the method of any one of Embodiments 1-19, wherein the surface layer of the activated carbon sorbent particles comprises about 0.001 wt %-about 99 wt % nitrogen.

Embodiment 21 provides the method of any one of Embodiments 1-20, wherein the surface layer of the activated carbon sorbent particles comprises about 5 wt %-about 80 wt % nitrogen.

Embodiment 22 provides the method of any one of Embodiments 1-21, wherein the surface layer of the activated carbon sorbent comprises a layer at the surface of the particle having a thickness of about 0.001% to about 99% of the radius of the particles.

Embodiment 23 provides the method of any one of Embodiments 1-22, wherein the surface layer of the activated carbon sorbent particles comprises a layer at the surface of the particles having a thickness of about 0.001% to about 50% of the radius of the particles.

Embodiment 24 provides the method of any one of Embodiments 1-23, wherein the activated carbon sorbent particles have an average diameter of about 0.1 μm to about 1000 μm.

Embodiment 25 provides the method of any one of Embodiments 1-24, wherein the surface layer of the sorbent particles is a continuous surface layer.

Embodiment 26 provides the method of any one of Embodiments 1-25, wherein obtaining or providing the activated carbon sorbent comprises: obtaining or providing a carbon precursor comprising nitrogen; and processing the carbon precursor with at least one of heating, microwaving, and irradiating, to provide the activated carbon sorbent.

Embodiment 27 provides the method of Embodiment 26, wherein the carbon precursor comprises a carbonaceous material comprising carbon and a nitrogenous material comprising nitrogen.

Embodiment 28 provides the method of Embodiment 27, wherein the carbonaceous material comprises at least one of brown sugar, barley sugar, caramel, cane sugar, corn syrup, starch, molasses, a glucan, a galactan, a xylan, and a sugar waste product.

Embodiment 29 provides the method of any one of Embodiments 27-28, wherein the nitrogenous material comprises a nitrogen-containing organic or inorganic compound.

Embodiment 30 provides the method of any one of Embodiments 27-29, wherein the nitrogenous material comprises a nitrogen heterocycle, a nitrogen-containing polymer or copolymer, a nitrile, a carbamate, an amino acid, nitrobenzene, hydroxylamine, urea, hydrazine, sulfamic acid, or a combination thereof.

Embodiment 31 provides the method of any one of Embodiments 26-30, further comprising: obtaining or providing a substrate material; contacting the carbon precursor and the substrate material, to provide a sorbent starting material; and processing the sorbent starting material with at least one of heating, microwaving, and irradiating, to provide the activated carbon sorbent.

Embodiment 32 provides the method of Embodiment 31, wherein heating the sorbent starting material provides a second sorbent starting material, further comprising reacting the second sorbent starting material with an acidic or basic material, to provide the activated carbon sorbent.

Embodiment 33 provides the method of any one of Embodiments 31-32, wherein the substrate comprises at least one of diatomaceous earth, a clay, a zeolite, or a mineral.

Embodiment 34 provides the method of any one of Embodiments 31-33, wherein heating the sorbent starting material comprises heating to about 100° C.-about 1200° C.

Embodiment 35 provides the method of any one of Embodiments 31-34 wherein the activated carbon sorbent comprises a carbon nanocomposite sorbent.

Embodiment 36 provides the method of any one of Embodiments 1-35, wherein the activated carbon sorbent comprises one or more binding sites.

Embodiment 37 provides the method of Embodiment 36, wherein at least a portion of the binding sites in the activated carbon sorbent react with at least one of the pollutant and the oxidized species of the pollutant, to form the pollutant-sorbent composition.

Embodiment 38 provides the method of any one of Embodiments 1-37, wherein the separating at least some of the pollutant-sorbent composition from the pollutant containing gas comprises separating in a particulate separator.

Embodiment 39 provides the method of Embodiment 38, wherein the particulate separator comprises an electrostatic precipitator (ESP), a baghouse, a wet scrubber, a filter, cyclone, fabric separator, or any combination thereof.

Embodiment 40 provides the method of any one of Embodiments 10-39, wherein a promoter precursor transforms into the halogen or halide promoter which then reacts with the activated carbon sorbent to give the activated carbon material.

Embodiment 41 provides the method of Embodiment 40, wherein the promoter precursor is at least one of on the unpromoted sorbent and added with the unpromoted sorbent.

Embodiment 42 provides the method of any one of Embodiments 1-41, further comprising at least one of during and prior to the contacting adding an alkaline component into the pollutant-containing gas.

Embodiment 43 provides the method of Embodiment 42, wherein the alkaline component comprises at least one of an oxide, hydroxide, carbonate, or phosphate of an alkali element, an alkali or alkaline-earth element, and a compound or material including the same.

Embodiment 44 provides the method of any one of Embodiments 1-43, wherein the activated carbon sorbent comprises a stabilizing agent comprising at least one of S, Se, or mixtures thereof.

Embodiment 45 provides the method of any one of Embodiments 1-44, wherein the activated carbon sorbent comprises a stabilizing agent comprising at least one of $H_2S$, $SO_2$, $H_2Se$, $SeO_2$, $CS_2$, $P_2S_5$, or mixtures thereof.

Embodiment 46 provides the method of any one of Embodiments 1-45, further comprising regenerating the pollutant-sorbent composition to give a regenerated activated carbon sorbent.

Embodiment 47 provides the method of any one of Embodiments 1-46, wherein the activated carbon sorbent is a generated activated carbon sorbent Embodiment 48 provides the method of any one of Embodiments 1-47, wherein at least one of the contacting and the separating occurs in an aqueous scrubber.

Embodiment 49 provides the method of Embodiment 48, wherein the scrubber comprises an aqueous slurry that comprises the activated carbon sorbent.

Embodiment 50 provides a method for reducing the mercury content of a mercury-containing gas, the method comprising: obtaining or providing a carbon precursor comprising nitrogen; obtaining or providing a substrate material; contacting the carbon precursor and the substrate material, to provide an inorganic matrix-supported sorbent starting material; heating the inorganic matrix-supported sorbent starting material, to provide an unpromoted sorbent; promoting at least a portion of the unpromoted sorbent by chemically reacting the portion of the unpromoted sorbent with a promoter to form a promoted inorganic matrix-supported activated carbon sorbent comprising activated carbon sorbent particles comprising nitrogen in a surface layer of the sorbent particles; contacting a mercury-containing gas with the activated carbon sorbent, to form a mercury-sorbent composition; and separating at least some of the mercury-sorbent composition from the mercury-containing gas, to give a separated gas; wherein the mercury-containing gas has a concentration of sulfur(VI) of about 3-2000 ppm by mole and a first quantity the activated carbon sorbent forms a mercury-sorbent composition at a first mercury adsorption rate, wherein the first adsorption rate is higher than a mercury absorption rate of the first quantity of a corresponding activated carbon sorbent comprising at least one of a) less or substantially no nitrogen in a corresponding particle surface layer, b) less or substantially no halide- or halogen-promotion, and c) less or substantially no inorganic matrix support.

Embodiment 51 provides a method of making an activated carbon sorbent, comprising: obtaining or providing an unpromoted carbon sorbent comprising nitrogen; promoting at least a portion of the unpromoted sorbent by contacting the portion of the unpromoted sorbent with a promoter to form an activated carbon sorbent comprising activated carbon sorbent particles comprising nitrogen, wherein the concentration of nitrogen in a surface layer of the sorbent particles is higher than the concentration of nitrogen in a core of the sorbent particles.

Embodiment 52 provides the method of Embodiment 51, further comprising: obtaining or providing a carbon precursor comprising nitrogen; obtaining or providing a substrate material; contacting the carbon precursor and the substrate material, to provide a sorbent starting material; and processing the sorbent starting material, to provide the unpromoted carbon sorbent comprising nitrogen.

Embodiment 53 provides the method of Embodiment 52, wherein obtaining or providing the carbon precursor comprising nitrogen comprises: obtaining or providing a carbonaceous material comprising carbon and a nitrogenous material comprising nitrogen; and contacting and heating the carbonaceous material and the nitrogenous material, to provide the carbon precursor comprising nitrogen.

Embodiment 54 provides a method of making an activated carbon sorbent, comprising: contacting a carbonaceous material and a nitrogenous material, to provide an unpromoted carbon sorbent comprising nitrogen; promoting at least a portion of the unpromoted sorbent by contacting the portion of the unpromoted sorbent with a promoter to form an activated carbon sorbent comprising activated carbon sorbent particles comprising nitrogen, wherein the concentration of nitrogen in the sorbent particles is higher than the concentration of nitrogen in the carbonaceous material.

Embodiment 55 provides an activated carbon sorbent made by the method of any one of Embodiments 51-54.

Embodiment 56 provides an activated carbon sorbent, comprising: a halogen- or halide-promoted activated carbon, the activated carbon comprising activated carbon sorbent particles comprising nitrogen in a surface layer of the sorbent particles.

Embodiment 57 provides the activated carbon sorbent of Embodiment 56, wherein the concentration of nitrogen in the surface layer of the sorbent particles is higher than the concentration of nitrogen in a core of the sorbent particles.

Embodiment 58 provides the activated carbon sorbent of any one of Embodiments 56-57, wherein the activated carbon sorbent particles have an average diameter of about 0.1 μm to about 1000 μm.

Embodiment 59 provides the activated carbon sorbent of any one of Embodiments 56-58, wherein the activated carbon is at least one of halogen-promoted, Group V halide-promoted, Group VI halide-promoted, hydrogen halide-promoted, ammonium halide-promoted, alkali earth metal halide-promoted, and alkaline earth metal halide-promoted.

Embodiment 60 provides the activated carbon sorbent of any one of Embodiments 56-59, wherein the activated carbon sorbent is inorganic matrix-supported, the inorganic matrix support comprising at least one of diatomaceous earth, a clay, a zeolite, or a mineral.

Embodiment 61 provides the activated carbon sorbent of any one of Embodiments 56-60, wherein the nitrogen is substantially homogenously distributed in the core of the activated carbon sorbent particles.

Embodiment 62 provides the activated carbon sorbent of any one of Embodiments 56-61, wherein the nitrogen in the surface layer of the particles at least partially decreases neutralization by $HSO_3^{1-}$ or $SO_3^{2-}$ of carbocations in the activated carbon sorbent, as compared to a corresponding activated carbon sorbent comprising less or substantially no nitrogen in a corresponding particle surface layer under substantially similar conditions.

Embodiment 63 provides the activated carbon sorbent of any one of Embodiments 56-62, wherein the nitrogen in the surface layer of the particles at least partially blocks carbocations in the activated carbon from forming ionic bonds with $HSO_3^{1-}$ or $SO_3^{2-}$, as compared to a corresponding activated carbon sorbent comprising less or substantially no nitrogen in a corresponding particle surface layer under substantially similar conditions.

Embodiment 64 provides the activated carbon sorbent of any one of Embodiments 56-63, wherein a first quantity of the activated carbon sorbent forms a mercury-sorbent composition at a first mercury adsorption rate in a gas composition comprising mercury wherein the concentration of sulfur(VI) in the gas composition is about 3-2000 ppm by mole, and wherein the first adsorption rate is higher than a mercury absorption rate of the first quantity of a corresponding activated carbon sorbent comprising at least one of a) less or substantially no nitrogen in a corresponding particle surface layer, b) less or substantially no halide- or halogen-promotion, and c) less or substantially no inorganic matrix support, wherein the activated carbon sorbent is inorganic-matrix supported.

Embodiment 65 provides the activated carbon sorbent of any one of Embodiments 56-64, wherein the nitrogen is derived from a nitrogen-containing organic or inorganic compound.

Embodiment 66 provides the activated carbon sorbent of any one of Embodiments 56-65, wherein the nitrogen is derived from indole, quinoxaline, carbazole, isoquinoline, nitrobenzene, urea, sulfamic acid, polyvinylpyrrolidone, vinylpyrrolidone-vinyl acetate copolymer, vinylpyrrolidone-acrylic acid copolymer, vinylpyrrolidone-maleic acid copolymer, polyethylenimine, alanine, piperazine, quinolone, quinoxaline, diazabicyclooctane, an amino acid, an ammonium salt, or a combination thereof.

Embodiment 67 provides an activated carbon sorbent for use in mercury removal from a mercury-containing gas, the sorbent comprising: a halogen- or halide-promoted activated carbon comprising activated carbon particles, the particles comprising nitrogen in a surface layer, the nitrogen in the surface layer at sufficient concentration to at least one of a) decrease neutralization by $HSO_3^{1-}$ or $SO_3^{2-}$ of carbocations in the activated carbon sorbent, as compared to a corresponding activated carbon sorbent comprising less or substantially no nitrogen in a corresponding particle surface layer under substantially similar conditions, and b) at least partially block carbocations in the activated carbon from forming ionic bonds with $HSO_3^{1-}$ or $SO_3^{2-}$, as compared to a corresponding activated carbon sorbent comprising less or substantially no nitrogen in a corresponding particle surface layer under substantially similar conditions.

Embodiment 68 provides the apparatus or method of any one or any combination of Embodiments 1-67 optionally configured such that all elements or options recited are available to use or select from.

What is claimed is:

1. A method of removing mercury from a mercury-containing flue gas, the method comprising:
    combusting coal comprising an added promoter precursor that comprises NaBr, CaBr$_2$, NaCl, CaCl$_2$, KI, NaI, CaI$_2$, NH$_4$Br, NH$_4$Cl, NH$_4$F, NaF, Ca$_2$F, or a combination thereof, to form the mercury-containing flue gas comprising a halogen- or halide-promoter that comprises Cl$^-$, HCl, Br$^-$, HBr, I$^-$, HI$^-$, F$^-$, HF, or a combination thereof;
    adding a nitrogen-containing compound and activated carbon sorbent particles together or separately into the mercury-containing flue gas upstream of a particle separation device, the nitrogen-containing compound comprising an ammonium salt, ammonia, urea, an inorganic nitrogen compound, or a combination thereof;

capturing mercury from the mercury-containing gas with the activated carbon sorbent particles, wherein the activated carbon sorbent particles in the flue gas comprise nitrogen in a surface layer thereof, the concentration of nitrogen in the surface layer being higher than the concentration of nitrogen in a core of the sorbent particles, the core of the sorbent particles comprising nitrogen; and removing the activated carbon sorbent particles from the mercury-containing gas with the particle separation device.

2. The method of claim 1, wherein the halogen- or halide-promoter comprises $Br_2$, $Cl_2$, $I_2$, $F_2$, ICl, or a combination thereof.

3. The method of claim 1, wherein the promoter precursor comprises KI, NaI, $CaI_2$, or a combination thereof, and the promoter comprises $I^-$, HI, or a combination thereof.

4. The method of claim 1, wherein the promoter precursor comprises $CaBr_2$, and the promoter comprises $Br^-$, HBr, or a combination thereof.

5. The method of claim 1, wherein the promoter precursor comprises NaBr, and the promoter comprises $Br^-$, HBr, or a combination thereof.

6. The method of claim 1, wherein the nitrogen-containing compound comprises the ammonium salt, wherein the ammonium salt comprises an ammonium halide.

7. The method of claim 1, wherein the nitrogen-containing compound comprises the ammonium salt, wherein the ammonium salt comprises ammonium chloride, ammonium bromide, or a combination thereof.

8. The method of claim 1, wherein the nitrogen-containing compound comprises the ammonium salt, wherein the ammonium salt comprises ammonium sulfate.

9. The method of claim 1, wherein the nitrogen-containing compound comprises the ammonium salt, wherein the ammonium salt comprises ammonium sulfate and the promoter precursor comprises NaBr, $CaBr_2$, or a combination thereof.

10. The method of claim 1, wherein the nitrogen-containing compound comprises ammonia.

11. The method of claim 1, wherein the nitrogen-containing compound comprises urea.

12. The method of claim 1, wherein the nitrogen-containing compound comprises the inorganic nitrogen compound, wherein the inorganic nitrogen compound is at least one of nitric acid, nitrous acid, nitrogen dioxide, and nitrogen oxide.

13. The method of claim 1, comprising promoting the activated carbon sorbent particles in the mercury-containing flue gas with the promoter.

14. The method of claim 1, wherein the surface layer of the activated carbon sorbent particles comprises a layer at the surface of the particles having a thickness of about 0.001% to about 50% of the radius of the particles.

15. The method of claim 1, wherein the surface layer of the activated carbon sorbent particles in the flue gas is about 0.001 wt % to about 99 wt % nitrogen.

16. The method of claim 1, wherein the mercury-containing gas comprises a concentration of sulfur(VI) and the concentration of sulfur(VI) in the mercury-containing gas is greater than or equal to about 1 ppm by mole and the promoted activated carbon sorbent particles form a mercury-sorbent composition at a higher absorption rate relative to corresponding promoted activated carbon sorbent particles comprising at least one of a) less or substantially no nitrogen in a corresponding particle surface layer, b) less or substantially no halide- or halogen-promotion.

17. The method of claim 1, wherein the activated carbon sorbent particles have an average diameter of about 0.1 micron to about 1,000 microns.

18. A method of removing mercury from a mercury-containing flue gas, the method comprising:

combusting coal comprising an added promoter precursor that comprises NaBr, to form the mercury-containing flue gas comprising a halogen- or halide-promoter that comprises Br, HBr, or a combination thereof;

injecting ammonium sulfate and activated carbon sorbent particles together or separately into the mercury-containing flue gas upstream of a particle separation device;

capturing mercury from the mercury-containing gas with the activated carbon sorbent particles, wherein the activated carbon sorbent particles in the flue gas comprise nitrogen in a surface layer thereof, the concentration of nitrogen in the surface layer being higher than the concentration of nitrogen in a core of the sorbent particles, the core of the sorbent particles comprising nitrogen; and removing the activated carbon sorbent particles from the mercury-containing gas with the particle separation device.

19. A method of removing mercury from a mercury-containing flue gas, the method comprising:

combusting coal comprising an added promoter precursor that comprises $CaBr_2$, to form the mercury-containing flue gas comprising a halogen- or halide-promoter that comprises $Br^-$, HBr, or a combination thereof;

injecting ammonium sulfate and activated carbon sorbent particles together or separately into the mercury-containing flue gas upstream of a particle separation device;

capturing mercury from the mercury-containing gas with the activated carbon sorbent particles, wherein the activated carbon sorbent particles in the flue gas comprise nitrogen in a surface layer thereof, the concentration of nitrogen in the surface layer being higher than the concentration of nitrogen in a core of the sorbent particles, the core of the sorbent particles comprising nitrogen; and removing the activated carbon sorbent particles from the mercury-containing gas with the particle separation device.

\* \* \* \* \*

UNITED STATES PATENT AND TRADEMARK OFFICE
CERTIFICATE OF CORRECTION

PATENT NO. : 11,059,028 B2
APPLICATION NO. : 16/574935
DATED : July 13, 2021
INVENTOR(S) : Olson et al.

It is certified that error appears in the above-identified patent and that said Letters Patent is hereby corrected as shown below:

On the Title Page

On page 4, in Column 1, under "Other Publications", Lines 39-40, delete "Jul. 9, 2011"," and insert --Jul. 19, 2011",-- therefor On page 4, in Column 1, under "Other Publications", Lines 55-56, delete "Oct. 4, 2013"," and insert --Jan. 4, 2013",-- therefor On page 7, in Column 1, under "Other Publications", Line 60, delete "11189249,3," and insert --11189249.3,-- therefor On page 7, in Column 2, under "Other Publications", Line 3, delete "11189252,7," and insert --11189252.7,-- therefor On page 7, in Column 2, under "Other Publications", Line 7, delete "11189252,7," and insert --11189252.7,-- therefor On page 7, in Column 2, under "Other Publications", Line 9, delete "11189252,7," and insert --11189252.7,-- therefor In the Specification In Column 7, Line 41, delete "70 wt %/o," and insert --70 wt %,-- therefor In Column 9, Line 67, delete "sorbtion." and insert --sorption.-- therefor In Column 16, Line 39, delete "CaCl$_2$))" and insert --CaCl$_2$)-- therefor In Column 17, Line 41, delete "1 w %" and insert --1 wt %-- therefor Signed and Sealed this
Twenty-eighth Day of September, 2021

Drew Hirshfeld
*Performing the Functions and Duties of the*
*Under Secretary of Commerce for Intellectual Property and*
*Director of the United States Patent and Trademark Office*

CERTIFICATE OF CORRECTION (continued)
U.S. Pat. No. 11,059,028 B2

In Column 20, Line 37, delete "and and" and insert --and-- therefor

In Column 21, Line 44, delete "49/o." and insert --49%.-- therefor

In Column 26, Line 43, delete "the the" and insert --the-- therefor

In the Claims

In Column 32, Line 62, in Claim 1, delete "HI⁻," and insert --HI,-- therefor

In Column 34, Line 21, in Claim 18, delete "Br," and insert --Br⁻,-- therefor

UNITED STATES PATENT AND TRADEMARK OFFICE
CERTIFICATE OF CORRECTION

| | |
|---|---|
| PATENT NO. | : 11,059,028 B2 |
| APPLICATION NO. | : 16/574935 |
| DATED | : July 13, 2021 |
| INVENTOR(S) | : Olson et al. |

Page 1 of 1

It is certified that error appears in the above-identified patent and that said Letters Patent is hereby corrected as shown below:

On the Title Page

Item (73), "Assignee", in Column 1, Line 1, delete "Midwwest" and insert --Midwest-- therefor Signed and Sealed this
Twenty-ninth Day of March, 2022

Drew Hirshfeld
*Performing the Functions and Duties of the*
*Under Secretary of Commerce for Intellectual Property and*
*Director of the United States Patent and Trademark Office*